US012625473B2

(12) United States Patent
Oshita

(10) Patent No.: US 12,625,473 B2
(45) Date of Patent: May 12, 2026

(54) SATELLITE RADIO WAVE RECEIVING DEVICE, ELECTRONIC WATCH, METHOD FOR CONTROLLING ACQUISITION OF DATE AND TIME INFORMATION, AND PROGRAM FOR THE SAME

(71) Applicant: CASIO COMPUTER CO., LTD., Tokyo (JP)

(72) Inventor: Yuuki Oshita, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 360 days.

(21) Appl. No.: 18/521,433

(22) Filed: Nov. 28, 2023

(65) Prior Publication Data

US 2024/0176307 A1 May 30, 2024

(30) Foreign Application Priority Data

Nov. 29, 2022 (JP) ................................ 2022-190763

(51) Int. Cl.
*G04R 20/04* (2013.01)

(52) U.S. Cl.
CPC .................................. *G04R 20/04* (2013.01)

(58) Field of Classification Search
CPC .......... G04R 20/04; G01S 19/256; G04G 5/00
(Continued)

(56) References Cited

U.S. PATENT DOCUMENTS 6,282,431 B1 * 8/2001 Konno .............. H04M 1/72451 455/425
7,801,132 B2 * 9/2010 Ofek ...................... H04L 47/50 370/389

(Continued)

FOREIGN PATENT DOCUMENTS

JP 2008145287 A 6/2008
JP 2013238617 A 11/2013

(Continued)

*Primary Examiner* — Sean Kayes
(74) *Attorney, Agent, or Firm* — Scully, Scott, Murphy & Presser, P.C.

(57) ABSTRACT

The present disclosure is provided to correctly adjust the leap second information while avoiding the increase in positioning time. Provided is a satellite radio wave receiving device including: a receiver that performs an acquisition operation of receiving a transmitted radio wave from a positioning satellite and acquiring information contained in the transmitted radio wave; one or more processors; and one or more memories in which leap second information related to a leap second adjustment may be stored, wherein the receiver retains the leap second information last acquired by the acquisition operation and wherein the one or more processors perform the following processes according to instructions stored in the one or more memories: activating the receiver in at least two modes including a first mode in which the acquisition operation is performed for continuous positioning; in the case of activating the receiver in the first mode, starting the acquisition operation without erasing the leap second information that the receiver retains and acquiring the leap second information that the receiver retains after the end of the first mode operation, and in the case where the acquired leap second information for this time is determined to be newer than the leap second information stored in the one or more memories, storing the leap second information for this time in the one or more memories; and performing a leap second adjustment for the counted current date and time, based on the leap second information lastly stored in the one or more memories.

19 Claims, 8 Drawing Sheets

(58) Field of Classification Search
USPC ........................................................... 368/47
See application file for complete search history.

(56) References Cited

U.S. PATENT DOCUMENTS

| | | | | |
|---|---|---|---|---|
| 11,372,377 | B2 * | 6/2022 | Akiyama | G04G 9/0076 |
| 2009/0010152 | A1 * | 1/2009 | Ofek | H04L 47/56 370/216 |
| 2019/0294123 | A1 * | 9/2019 | Akiyama | G04R 20/04 |
| 2019/0332060 | A1 * | 10/2019 | Kaneko | G04C 3/146 |
| 2020/0059319 | A1 * | 2/2020 | Takahashi | H04L 5/0007 |

FOREIGN PATENT DOCUMENTS

| | | | |
|---|---|---|---|
| JP | 2015132537 | A | 7/2015 |
| JP | 2019060753 | A | 4/2019 |

* cited by examiner

FIG. 4

| Pattern No. | Watch-side leap second information (a) | GPS-side leap second information (b) | Leap second information updated at end of first mode (c) | Leap second information updated at end of second mode (d) |
|---|---|---|---|---|
| P1 | 18,2000/0/0,18 | 18,2000/0/0,18 | No | No |
| P2 | | 18,2023/1/1,19 | Yes | Yes |
| P3 | | 19,2023/1/1,19 | No | Yes |
| P4 | | 19,2000/0/0,19 | No | Yes |
| P5 | 18,2023/1/1,19 | 18,2000/0/0,18 | No | No |
| P6 | | 18,2023/1/1,19 | No | No |
| P7 | | 19,2023/1/1,19 | No | Yes |
| P8 | | 19,2000/0/0,19 | No | Yes |
| P9 | 19,2023/1/1,19 | 19,2023/1/1,19 | No | No |
| P10 | | 19,2000/0/0,19 | No | No |
| P11 | 19,2000/0/0,19 | 19,2023/1/1,19 | No | No |
| P12 | | 19,2000/0/0,19 | No | No |

SATELLITE RADIO WAVE RECEIVING DEVICE, ELECTRONIC WATCH, METHOD FOR CONTROLLING ACQUISITION OF DATE AND TIME INFORMATION, AND PROGRAM FOR THE SAME

BACKGROUND OF THE INVENTION

Field of the Invention

The present disclosure relates to a satellite radio wave receiving device, an electronic watch, a method for controlling acquisition of date and time information, and a program for the same.

Description of the Related Art

There is already known a technique of receiving radio waves from positioning satellites such as positioning satellites (GPS satellites) related to a global positioning system (GPS) of the United States to acquire accurate date and time information and maintaining accuracy by modifying the date and time to be counted. In addition, the current position is able to be identified by receiving radio waves from a plurality of positioning satellites for positioning.

Currently, a leap second adjustment, which is to insert or delete a leap second into or at the date and time, is performed in some cases. In an electronic watch, when a leap second adjustment is performed, the date and time are adjusted according to the timing at which the leap second adjustment is performed. The adjustable timing at which a leap second adjustment can be performed is predetermined, but the timing at which the leap second adjustment is actually performed is irregular. For example, according to the disclosure of Japanese Unexamined Patent Application Publication No. 2008-145287, a GPS satellite transmits leap second information related to a leap second adjustment once every 12.5 minutes. Acquiring this leap second information enables determination of whether the leap second adjustment is performed and of the value of the leap second adjustment.

The leap second information related to the latest leap second adjustment is able to be acquired without fail by acquiring information from newly received transmitted radio waves after erasing information that has been previously acquired and retained from the transmitted radio waves of the positioning satellites (for example, almanac information related to the predicted orbit of a positioning satellite, leap second information, and the like).

SUMMARY OF THE INVENTION

According to a first aspect of the present disclosure, there is provided a satellite radio wave receiving device that includes:

- a receiver that performs an acquisition operation of receiving a transmitted radio wave from a positioning satellite and acquiring information contained in the transmitted radio wave;

one or more processors; and one or more memories in which leap second information related to a leap second adjustment may be stored, wherein:

the receiver retains the leap second information last acquired by the acquisition operation; and the one or more processors perform the following processes according to instructions stored in the one or more memories:

- activating the receiver in at least two modes including a first mode in which the acquisition operation is performed for continuous positioning;
- in the case of activating the receiver in the first mode, starting the acquisition operation without erasing the leap second information that the receiver retains and acquiring the leap second information that the receiver retains after the end of the first mode operation, and in the case where the acquired leap second information for this time is determined to be newer than the leap second information stored in the one or more memories, storing the leap second information for this time in the one or more memories; and
- performing a leap second adjustment for the counted current date and time, based on the leap second information lastly stored in the one or more memories.

Further features of the present disclosure will become apparent from the following description of exemplary embodiments (with reference to the attached drawings).

BRIEF DESCRIPTION OF THE DRAWINGS

FIG. 4 is a diagram for describing patterns of leap second information update operations.

DESCRIPTION OF THE EMBODIMENTS

Hereinafter, the embodiments of the present disclosure will be described with reference to attached drawings.

(Configuration of Electronic Watch)

Figure 1:
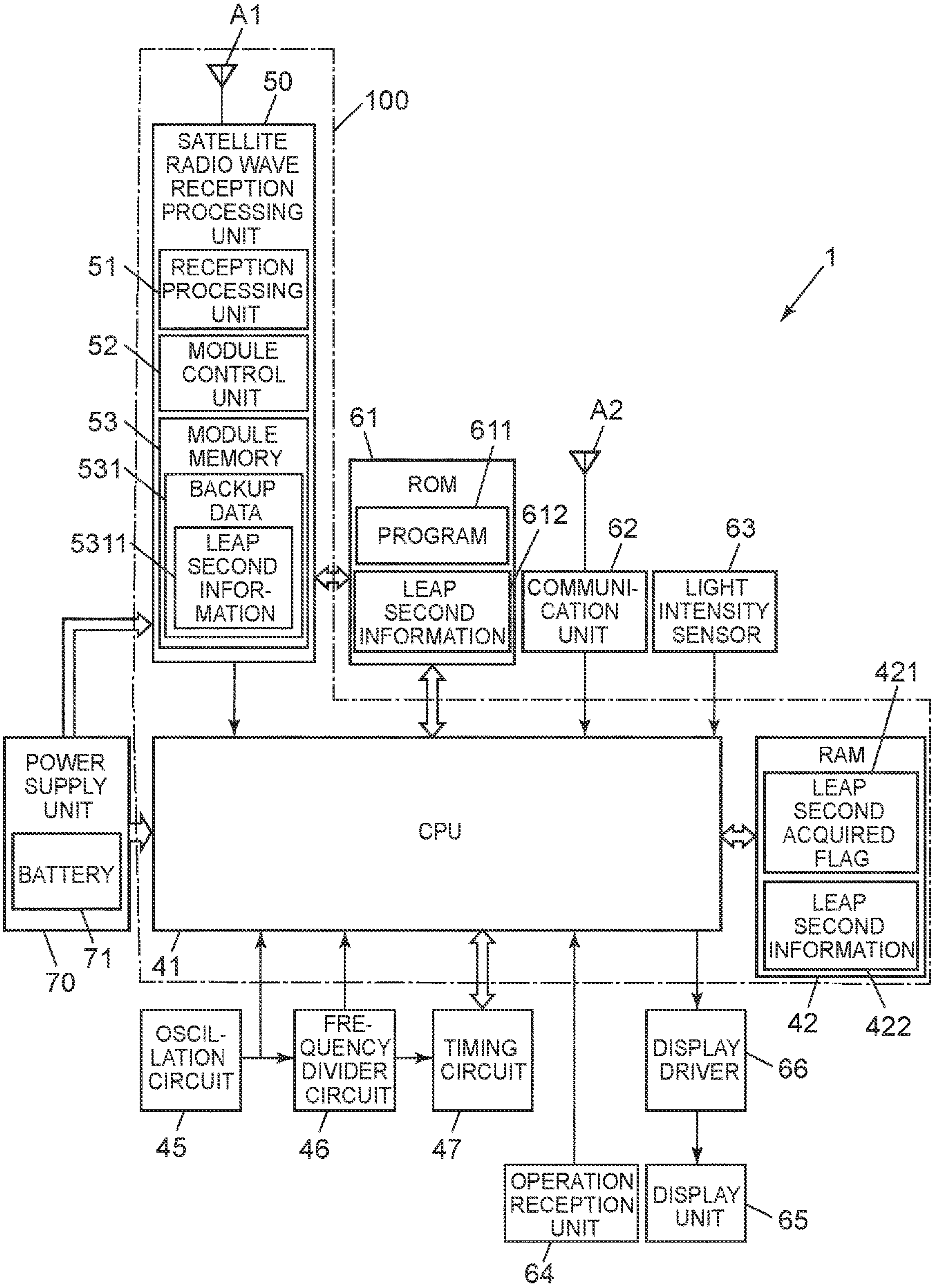
FIG. 1 is a block diagram illustrating a functional configuration of an electronic watch according to an embodiment of the present disclosure.

FIG. 1 is a block diagram illustrating a functional configuration of an electronic watch 1 according to an embodiment of the present disclosure.

This electronic watch 1 is an electronic watch that is mainly carried and used by a user, such as, for example, an electronic wristwatch.

The electronic watch 1 includes: a central processing unit (CPU) 41 (computer), a random access memory (RAM) 42, an oscillation circuit 45, a frequency divider circuit 46, a timing circuit 47, a satellite radio wave reception processing unit 50 (receiver) and an antenna A1 therefor, and a read only memory (ROM) 61, a communication unit 62 and an antenna A2 therefor, a light intensity sensor 63, an operation reception unit 64, a display unit 65, a display driver 66, a power supply unit 70, and the like.

The CPU 41 is a processor that reads and executes a program 611 stored in the ROM 61 and performs various arithmetic operations to control the operation of the electronic watch 1. In this embodiment, the CPU 41 corresponds to a control unit. The electronic watch 1 may have a plurality of processors (for example, a plurality of CPUs), and the plurality of processes performed by the CPU 41 in this embodiment may be performed by the plurality of processors. In this case, the plurality of processors constitutes the control unit. In this case, the plurality of processors may be involved in a common process, or the plurality of processors may independently perform different processes in parallel.

The CPU 41 is able to transmit a signal to the timing circuit 47 on the basis of date and time information acquired from the satellite radio wave reception processing unit 50, and to modify (correct) the current date and time counted by the timing circuit 47. In the case where the RAM 42 stores notice information (implementation information) that a leap second is to be inserted or deleted (leap second adjustment) as leap second information 422, then the CPU 41 adjusts the current date and time counted and output according to the notice information at the scheduled timing of the leap second adjustment.

The RAM 42 provides the CPU 41 with a working memory space and stores various temporary data and setting data able to be overwritten and updated. The RAM 42 contains a leap second acquired flag 421 (acquired flag) and leap second information 422.

The leap second acquired flag 421 is a binary flag that determines whether the information indicating whether the leap second adjustment is actually performed (has been performed) at the most recent timing when the leap second adjustment may be performed within a predetermined period (adjustable timing, hereinafter also referred to as “next leap second update date”) (necessary leap second information) has been acquired. The leap second acquired flag 421 is set off (for example, to “0”) when the leap second information 422 (or the leap second information 612 described later) necessary for leap second adjustment at the leap second adjustable timing is not stored in the RAM 42 (or ROM 61) within a predetermined period. Currently, the leap second adjustment is performed by inserting 23:59:60 after 23:59:59 or deleting 23:59:59 on June 30 and December 31 in Coordinated Universal Time (UTC). The predetermined period is reset and starts anew before a predetermined time of the adjustable timing, and continues until the reset timing for the next adjustable timing. The reset (start) timing is set here to the head timing (first reference timing) of the month when the leap second adjustment may be performed, in other words, 0:00:00 (UTC) on December 1 and June 1. In other words, the leap second acquired flag 421 is set off at the above reset timing, specifically, at 0:00:0 on December 1 and June 1. In the case where the leap second adjustment is to be performed at the timing other than the twice a year timing (at the end of another month), the reset timing may be changed as appropriate.

The leap second information 422 includes information on the timing when the leap second adjustment is performed and the type of the adjustment (the presence or absence of the adjustment and the type of insertion or deletion at the time of the adjustment) within the predetermined period described above. In detail, the leap second information 422 includes information on the current leap second, the next leap second update date, the leap second after the next update, and the dates of receipt of these kinds of information. The leap second information 422 is referenced by the CPU 41 and is used to adjust the date and time counted by the timing circuit 47 at the timing when the leap second adjustment is performed.

The oscillation circuit 45 outputs an oscillation signal of a predetermined frequency such as, for example, about 32 kHz. This oscillation circuit 45 includes, but is not particularly limited to, for example, a small, low cost, low power consumption crystal oscillator without a temperature compensation circuit.

The frequency divider circuit 46 divides the oscillation signal and then generates and outputs a required frequency signal. The frequency divider circuit 46 is capable of outputting signals of different frequencies by switching the frequency division ratio appropriately according to the control signal from the CPU 41.

The timing circuit 47 counts the current date and time by adding the elapsed time to the set date and time acquired from a real time clock (RTC), which is not illustrated, on the basis of the predetermined frequency signal input from the frequency divider circuit 46. The date and time counted by the timing circuit 47 is able to be rewritten and modified by a control signal from the CPU 41 on the basis of the current date and time data acquired from the satellite radio wave reception processing unit 50 or the like.

The oscillation circuit 45, the frequency divider circuit 46, and the timing circuit 47 may be formed on a single microcomputer chip together with the CPU 41 and the RAM 42. Alternatively, the crystal oscillator of the oscillation circuit 45 and the RAM 42 may be external to the microcomputer.

The satellite radio wave reception processing unit 50 is a module that receives radio waves transmitted from a positioning satellite to acquire date and time information and location information and then outputs these types of information. The satellite radio wave reception processing unit 50 is supplied with electric power during operation, separately from other parts, by the control signal from the CPU 41.

The satellite radio wave reception processing unit 50 performs an operation of receiving a radio wave transmitted from a positioning satellite to acquire information contained in the transmitted radio wave (hereinafter, referred to as “acquisition operation”). The satellite radio wave reception processing unit 50 includes a reception processing unit 51, a module control unit 52, a module memory 53, and the like. The reception processing unit 51 receives radio waves transmitted from a positioning satellite by using an antenna A1, which is capable of receiving transmitted radio waves in the Li band (1.57542 GHz for positioning satellites related to GPS; the term “GPS satellites” is used hereafter to collectively refer to positioning satellites related to GPS, including GPS satellites and GPS complementary satellites such as QZS satellites. About 1.6 GHz for the GLONASS satellites), captures the radio waves (received frequencies, C/A code and phase synchronization) from the respective positioning satellites, and demodulates the signals (navigation messages). The module control unit 52 controls the operation of the satellite radio wave reception processing unit 50. In addition, the module control unit 52 performs the process of acquiring the current date and time and performs arithmetic operations related to positioning, on the basis of the navigation message acquired from the radio waves transmitted from the positioning satellites.

The module memory 53 has a non-volatile memory, and stores control information and positioning results related to the reception of the radio waves transmitted from the positioning satellites, as backup data 531. The backup data

531 includes location information (ephemeris information and almanac information) and leap second information 5311 of each positioning satellite.

The leap second information 5311 is correction data related to the leap second for date and time received from the GPS satellite and the information related to the implementation of the leap second adjustment. In detail, the leap second information 5311 includes information on the current leap second, the next leap second update date, and the leap second after the next update. The satellite radio wave reception processing unit 50 retains the leap second information 5311 for the leap second adjustment last acquired by the above acquisition operation (or overwrites and updates the leap second information 5311 acquired in the past, if any). The implementation of the leap second adjustment is not considered in a satellite clock that counts the time and date on a GPS satellite. The leap second information 5311 includes a shift amount TLS (the current leap second: in the case where the next leap second update date has passed, the leap second after the next update) for converting the date and time of the satellite clock to the UTC date and time and so on. Upon acquiring date and time data from the GPS satellite, the satellite radio wave reception processing unit 50 refers to the leap second information 5311 and converts the date and time acquired from the positioning satellite to the UTC date and time by delaying the date and time acquired from the positioning satellite by the time according to the shift amount TLS. In other words, normally the satellite radio wave reception processing unit 50 is able to acquire accurate UTC date and time by receiving and identifying only the date and time of the satellite clock without acquiring information on the shift amount TLS from the radio waves transmitted from the GPS satellite every time.

Moreover, the satellite radio wave reception processing unit 50 is able to acquire the date and time information from only a single (one) positioning satellite. In this case, with correction of the amount of delay corresponding to about the average value (about 70 to 75 msec) of the propagation time (65 msec to 90 msec) of the radio waves from the positioning satellite to the receiving point, the date and time information is output with less influence of the amount of delay. In the case where the amount of delay is able to be estimated more accurately, the amount of delay is able to be corrected.

The ROM 61 is a non-transitory storage medium readable by the CPU 41 as a computer. The ROM 61 stores various programs 611 and setting data for performing various operations of the electronic watch 1. The program 611 includes a program related to the acquisition and management of leap second information. The setting data contains leap second information 5311 acquired by the satellite radio wave reception processing unit 50 as leap second information 612. The ROM 61 is able to be read/write accessed by both the CPU 41 and the satellite radio wave reception processing unit 50. In this embodiment, the RAM 42 and the ROM 61 constitute memories.

The communication unit 62 controls the operation of communication with external devices. Short-distance wireless communication such as, for example, Bluetooth (registered trademark) is used as a communication method here. The CPU 41 transmits and receives information via the communication unit 62 and the antenna A2 therefor to and from external devices that have been set as connection target devices in advance with the settings stored in the RAM 42 or the like.

The light intensity sensor 63 measures the intensity of light emitted from the outside. The light intensity sensor 63 is placed, for example, in parallel with the display screen of the display unit 65. For example, a photodiode is used as the light intensity sensor 63, though not limited thereto. The light intensity sensor 63 outputs an electrical signal (voltage signal or current signal) in accordance with the intensity of incident light. This electrical signal is digitally sampled by an analog-to-digital converter (ADC), which is not illustrated, and is input to the CPU 41.

The operation reception unit 64 is equipped with a plurality of operation keys and pushbuttons, and when these operation keys and pushbuttons are operated, converts the operations concerned into electrical signals and outputs the electrical signals to the CPU 41 as input signals. In addition to or instead of the operation keys and pushbuttons, the operation reception unit 64 may be equipped with a crown, a touch sensor, and the like.

The display unit 65 has a display screen and displays various information including date and time information on the basis of a drive signal from the display driver 66. A segment liquid crystal display (LCD) is used as a display screen, though not limited thereto. The display screen may be configured to be able to display a successful reception mark indicating that the date and time are counted and displayed with the date and time based on the accurate date and time acquired by the most recent reception of radio waves from the positioning satellite. Alternatively, the electronic watch 1 may have, as the display unit 65, a plurality of hands and a stepping motor that rotates the plurality of hands, and may be of an analog pointer type that displays the date and time information or the like according to the position indicated by the plurality of hands, or of a combination of a pointer display and a digital display.

The power supply unit 70 supplies the power necessary for the operation of each part of the electronic watch 1 from a battery 71 at a predetermined voltage. For example, a detachable button-type primary battery is used as the battery 71. Alternatively, it may be equipped with a solar panel or a storage battery (rechargeable battery) that stores the electric power generated by the solar panel.

In this embodiment, the satellite radio wave receiving device 100 is composed of the satellite radio wave reception processing unit 50 as a receiver, the CPU 41 as a control unit, and the RAM 42 and the ROM 61 as memories.

(Navigation Messages)

Subsequently, navigation messages received from the positioning satellites are described.

Figure 2:
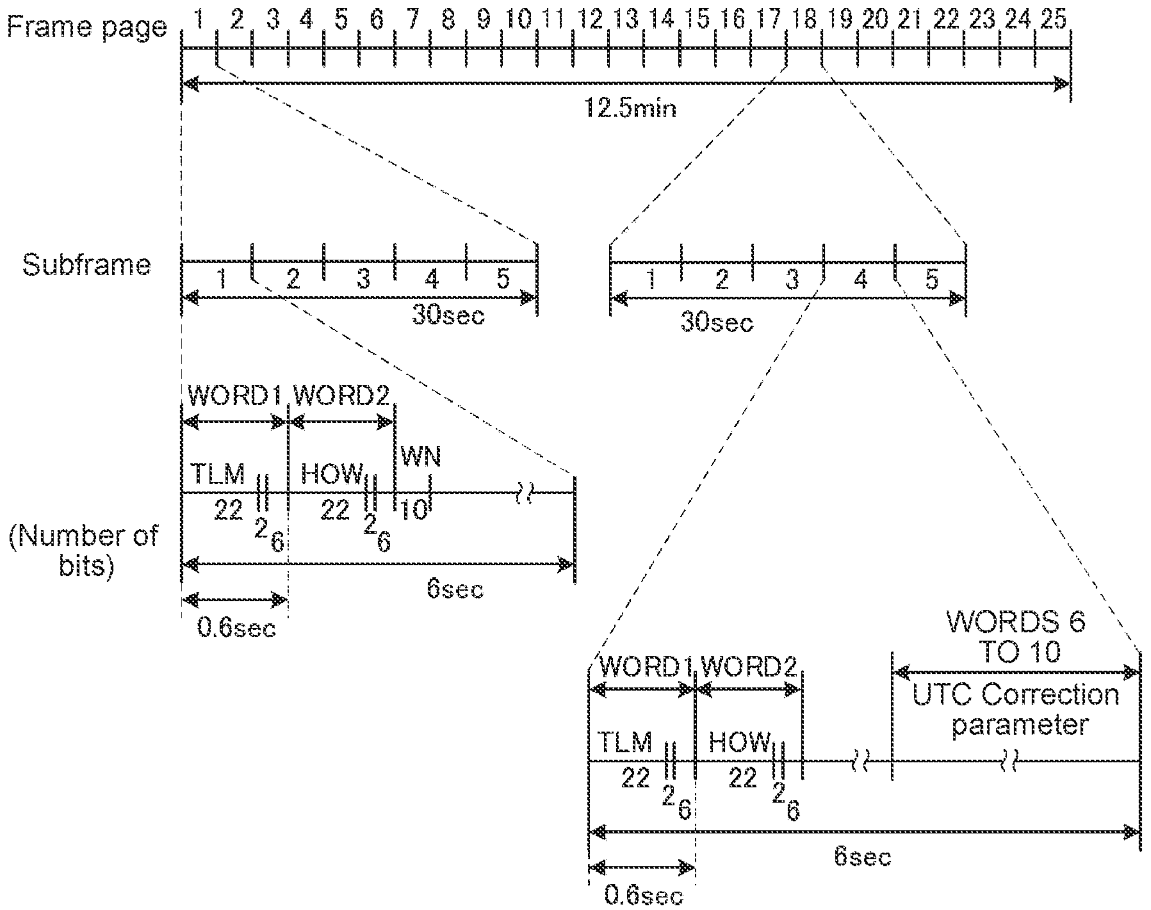
FIG. 2 is a diagram for describing a format of a navigation message transmitted by a GPS satellite.

FIG. 2 is a diagram for describing the format of a navigation message transmitted by a GPS satellite.

A navigation message transmitted from a GPS satellite is composed of total of 25 pages of frame data, each page of which takes 30 seconds to transmit. Each frame (page) is composed of five subframes of data (six seconds each, 1500 bits), and each subframe data is further composed of 10 words (0.6 seconds each, 300 bits). Therefore, navigation messages are to be transmitted in 12.5 minute cycles.

WORD1 of every subframe contains a telemetry word (TLM), and a preamble, which is a fixed code string at the beginning of the TLM, defines the beginning position of the subframe. In WORD2, a handover word (HOW) is transmitted. The HOW includes TOWCount (also called Z-count), which indicates the elapsed time in the week from Sunday midnight, and a subframe ID. The subframe ID indicates which of the five subframes is on each page (in each frame).

Moreover, in all frames, WORD3 of the data in subframe 1 contains WN (week number). This WN indicates the number of the week starting on Jan. 6, 1980, which is counted periodically by 10 bits. In other words, by acquiring the data of one frame (5 subframes), these WN and HOW data are acquired with certainty. In the case where the date and time counted by the timing circuit 47 are expected to be small enough for the time span indicated by HOW, in other words, one week, the current date and time are able to be obtained on the basis of the HOW data and the date and time of the timing circuit 47 without acquiring WN data. In this case, the HOW data of any subframe may be acquired.

Therefore, in the case of acquiring the date and time information from the radio waves transmitted from a GPS satellite, the electronic watch 1 receives the data of two words to five subframes as needed to acquire the date and time information.

In WORD3 of subframes 2 and 3 and after, ephemeris data, which is orbit information of a GPS satellite that has transmitted the navigation message, is transmitted. In a part of subframe 4 and WORD3 of subframe 5 and after, almanac data related to predicted orbits of all GPS satellites are divided into pages, and are transmitted sequentially with the satellite IDs.

In another part of subframe 4, information on the data status of the satellite is transmitted, and page 18 contains UTC correction parameters from WORD6 to WORD10. In other words, the UTC correction parameters are able to be acquired only at the timing of the transmission of this subframe 4 once in 25 pages.

As mentioned above, the satellite clock date and time (satellite date and time, transmission date and time) counted and transmitted by each GPS satellite is the date and time starting from Jan. 6, 1980, which does not reflect the implementation of the leap second adjustment. Therefore, there is a time lag between the satellite date and time and the UTC date and time by the total number of leap seconds inserted by the leap second adjustment performed on and after Jan. 6, 1980. In addition to the current leap second shift amount TLS (leap second correction value), the UTC correction parameters include the scheduled week number WNLSF and day number DN (the next leap second update date) when the next leap second adjustment is scheduled to be performed, and the scheduled value TLSF of the shift amount after the implementation of the adjustment (leap second after the next update). The satellite radio wave reception processing unit 50 corrects (subtracts) the calculated satellite date and time (transmission date and time) by the shift amount TLS and outputs the corrected date and time as the current date and time in UTC. The acquired leap second shift amount TLS is continuously available until the next leap second adjustment is performed. In the case where the scheduled week number WNLSF, the day number DN, and the scheduled value TLSF are acquired before the leap second adjustment is performed, the retained shift amount TLS data is able to be promptly updated after the leap second adjustment is performed to reflect the leap second implementation in the current date and time to be counted.

Figure 3:
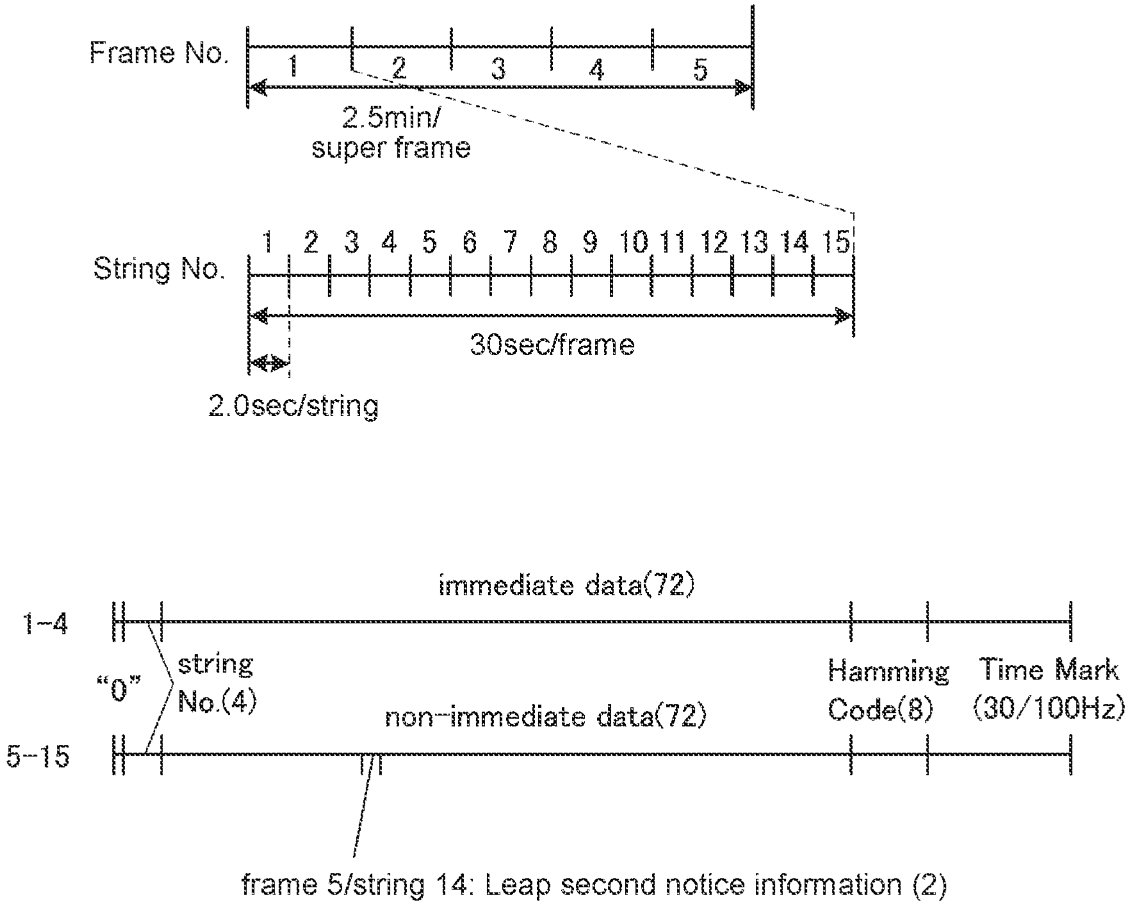
FIG. 3 is a diagram for describing a format of a navigation message transmitted by a GLONASS satellite.

FIG. 3 is a diagram illustrating a format of a navigation message transmitted by a GLONASS satellite.

In GLONASS, the navigation message is transmitted in a super frame having a total of five frame data, each of which is transmitted in 30-second units from each GLONASS satellite, and including all the data in a 2.5-minute cycle.

Each frame data is composed of 15 strings (two seconds each). Each string includes an array of 85 binary codes (1.7 sec) transmitted at 50 bps and a time mark (0.3 sec) transmitted at 100 Hz.

Among the 15 strings, the first four strings contain ephemeris data (immediate information), and the remaining 11 strings contain almanac data (non-immediate information). At the beginning of the 15 strings, a fixed code “0” is transmitted, followed by the string number m (string No.) in 4 bits. Then, after the transmission of 72 bits of information, an 8-bit Hamming code is transmitted, and finally a 30-bit time mark is transmitted.

Both the information related to the current date and time and the information related to the current position of the positioning satellite are included in the ephemeris data (the first four strings) and are transmitted in each frame. The information related to the current date and time includes each frame time tk, the day number NT from January 1 of the leap year, the day number NA for the almanac data, and the cycle number N4 for the four-year cycle starting from 1996. The information related to the position of the positioning satellite includes three components (xn, yn, zn) of the current position, three components of the velocity, and three components of the acceleration.

In the GLONASS satellite, the leap second adjustment is reflected on the transmitted date and time, and therefore there is no shift amount TLS. On the other hand, the adjustment information KP on whether the next leap second adjustment is performed at the adjustable timing and, when it is performed, whether the leap second is inserted or deleted is transmitted in the 27th and 28th bits only in the string 14 of frame 5. The combination of the two bits indicates the following four states: whether the leap second adjustment is able to be performed is not determined (10); whether the adjustment is scheduled to be not performed (00); the adjustment is scheduled to be performed and a leap second is to be inserted (01); and the adjustment is scheduled to be performed and a leap second is to be deleted (11). In other words, the notice information for the implementation of the leap second adjustment is included in the almanac data and transmitted only once every 2.5 minutes.

(Operation of Electronic Watch)

The following describes the operation of leap second adjustment performed in the electronic watch 1 of this embodiment.

In the electronic watch 1 of this embodiment, the CPU 41 is able to operate the satellite radio wave reception processing unit 50 in the first mode in which an acquisition operation is performed for continuous positioning, and in the second mode in which an acquisition operation is performed for acquiring the current date and time. The CPU 41 may be able to operate the satellite radio wave reception processing unit 50 in modes other than the first mode and the second mode.

First Mode

The first mode is a mode in which positioning is performed automatically at a first predetermined interval while the activity of a user wearing the electronic watch 1 is being measured. The acquisition operation for continuous positioning in the first mode is an acquisition operation that is performed repeatedly at a frequency that enables appropriate acquisition of the movement history (log) of the electronic watch 1 (user). The above frequency does not necessarily have to be fixed intervals. In the first mode, for example, the acquisition operation (reception of the transmitted radio wave from a positioning satellite and acquisition of information from the transmitted radio wave) by the satellite radio wave reception processing unit 50 is performed continuously, and the current position is calculated every second or at short time intervals (for example, two seconds to three minutes or so, including cases where the time interval is changed depending on whether acceleration is detected by an acceleration sensor, which is not illustrated), or an acquisition operation and calculation of the current position are performed intermittently at the relevant time intervals. In this specification, it is assumed that "positioning" includes an acquisition operation of information from the radio waves transmitted by a positioning satellite and an operation of calculating the current position on the basis of information obtained by the acquisition operation.

In this embodiment, it is assumed that the satellite radio wave reception processing unit 50 operates in the first mode during the period when the user wearing the electronic watch 1 is engaged in an activity such as running, and that continuous positioning is performed.

In the first mode, the current date and time may also be calculated based on the information acquired from the radio waves transmitted from the positioning satellite.

When operating the satellite radio wave reception processing unit 50 in the first mode, the CPU 41 transmits a hot start command to the satellite radio wave reception processing unit 50 to start positioning. The hot start command is a command to start positioning without erasing the backup data 531 (including the leap second information 5311) retained by the satellite radio wave reception processing unit 50. Thereby, in the first mode, the satellite radio wave reception processing unit 50 starts capturing and tracking a positioning satellite in a short time (for example, a few seconds) by using the almanac information contained in the backup data 531, thereby enabling the start of a positioning operation using the transmitted radio wave of the tracked positioning satellite.

When the satellite radio wave reception processing unit 50 operates in the first mode for continuous positioning, as long as a UTC correction parameter is acquired from the GPS satellite during the continuous positioning, then the current shift amount TLS, the scheduled week number WNLSF, the day number DN, and the scheduled value TLSF of the shift amount after the adjustment are acquired, and based thereon, the leap second information 5311 (the current leap second, the next leap second update date, the leap second after the next update, and their dates of receipt) are updated and retained. Moreover, as long as the adjustment information KP is acquired from the GLONASS satellite, information on whether the leap second adjustment is performed and information on the type of insertion or deletion are acquired, and the leap second information 5311 is updated and retained.

On the other hand, in the case where the UTC correction parameter is not acquired during the continuous positioning, the content of the leap second information 5311 that is retained at the start of the continuous positioning (at the start of the operation in the first mode) is maintained as it is.

When the activity is completed, the CPU 41 terminates the positioning of the satellite radio wave reception processing unit 50 in the first mode. In addition, when the leap second acquired flag 421 is off, the CPU 41 acquires the leap second information 5311 retained by the satellite radio wave reception processing unit 50. Hereinafter, in the first mode, the leap second information 5311 acquired at this timing is referred to as "GPS-side leap second information" (corresponding to "leap second information for this time"). Moreover, in the case where it is determined that the acquired GPS-side leap second information is newer than the leap second information 422 stored in the RAM 42 and/or the leap second information 612 (hereinafter, referred to as "watch-side leap second information") stored in the ROM 61 at that time, the CPU 41 stores the acquired GPS-side leap second information as the leap second information 422 in the RAM 42 and/or the leap second information 612 in the ROM 61 and updates the leap second information. The watch-side leap second information may be leap second information 5311 previously acquired from the satellite radio wave reception processing unit 50, and may be leap second information acquired from a unit other than the satellite radio wave reception processing unit 50 (for example, from an external device via the communication unit 62).

Specifically, when at least one of the following conditions (condition 1) and (condition 2) is not satisfied and (condition 3) is satisfied, the CPU 41 stores the GPS-side leap second information acquired after the end of the acquisition operation in the first mode as new watch-side leap second information into the RAM 42 and/or the ROM 61 and updates the leap second information:

(Condition 1) The "current leap second" of the watch-side leap second information is identical with the "current leap second" of the GPS-side leap second information;

(Condition 2) The "leap second after the next update" in the watch-side leap second information is identical with the "leap second after the next update" in the GPS-side leap second information; and (Condition 3) The GPS-side leap second information contains the "next leap second update date," and the "next leap second update date" is later than the current UTC time (the current date and time).

In the case where at least one of the above conditions (condition 1) and (condition 2) is not satisfied and (condition 3) is satisfied, it is able to be confirmed that the GPS-side leap second information is the information indicating the content of the adjustment at the next most recent leap second adjustable timing (December 31 or June 30) and that the GPS-side leap second information is newer than the watch-side leap second information. Moreover, in this case, the CPU 41 sets the leap second acquired flag 421 to ON, since there is no need thereafter to acquire new leap second information for the leap second adjustment at the most recent leap second adjustable timing.

As one aspect in which the above (condition 3) is not satisfied, there is a case where "the next leap second update date" in the GPS-side leap second information is not included (indefinite). In this case, it cannot be confirmed that the GPS-side leap second information is the information that indicates the content of adjustment at the next most recent leap second adjustable timing. Moreover, the GPS-side leap second information may be older than the watch-side leap second information. Therefore, when this GPS-side leap second information is stored in the RAM 42 and/or the ROM 61 as watch-side leap second information, the leap second adjustment based on this watch-side leap second information may be inappropriate at the next adjustable timing. For this reason, the CPU 41 does not store the GPS-side leap second information in the RAM 42 and/or the ROM 61.

As another aspect in which the above (condition 3) is not satisfied, there is a case where "the next leap second update date" in the GPS-side leap second information is earlier than the current UTC time. In this case, the GPS-side leap second information is considered to be old information acquired in the past and cannot be confirmed to be the information that represents at least the content of adjustment at the next most recent leap second adjustable timing. The GPS-side leap second information also may be older than the watch-side leap second information. Therefore, the GPS-side leap second information stored in the RAM 42 and/or the ROM 61 as watch-side leap second information may lead to inappropriate leap second adjustment that is performed based on the watch-side leap second information at the next adjustable timing. Therefore, the CPU 41 does not store the GPS-side leap second information in the RAM 42 and/or the ROM 61.

When both the above conditions (condition 1) and (condition 2) are satisfied (in other words, the "current leap second" in the watch-side leap second information is identical with the "current leap second" in the GPS-side leap second information, and the "next leap second after the next update" in the watch-side leap second information is identical with the "next leap second after the next update" in the GPS-side leap second information), the GPS-side leap second information may be identical with the watch-side leap second information (in other words, the GPS-side leap second information is not able to be definitively determined to be newer than the watch-side leap second information). Therefore, the CPU 41 does not store the GPS-side leap second information in the RAM 42 and/or the ROM 61 in this case as well.

Second Mode

In response to a predetermined input operation to the operation reception unit 64 or at a predetermined timing, the electronic watch 1 performs operations of receiving a radio wave transmitted from a positioning satellite to acquire the current date and time and modifying (correcting) the current date and time counted by the timing circuit 47. In this case, the CPU 41 activates the satellite radio wave reception processing unit 50 in the second mode. Specifically, the second mode is a mode in which positioning is performed automatically at a second predetermined interval, or in response to a predetermined input operation by a user wearing the electronic watch 1. In the second mode, the satellite radio wave reception processing unit 50 performs an acquisition operation, calculates the current UTC time on the basis of the information acquired by the acquisition operation, and outputs the calculated current UTC time to the CPU 41. In this specification, "acquiring the current date and time" and "acquiring the date and time" shall include the acquisition operation and the operation of calculating the current UTC time on the basis of the information acquired by the acquisition operation. In the second mode, positioning may also be performed.

When the satellite radio wave reception processing unit 50 is activated in the second mode, the CPU 41 transmits a cold start command to the satellite radio wave reception processing unit 50 to start the date and time acquisition. The cold start command is used to erase the backup data 531 (including the leap second information 5311) retained by the satellite radio wave reception processing unit 50 before starting the acquisition operation. Thereby, in the second mode, the accurate current date and time are able to be acquired reliably on the basis of the information newly acquired from the radio wave transmitted from a positioning satellite. When the UTC correction parameter is acquired from the transmitted radio wave, the latest leap second information 5311 is retained in the module memory 53 of the satellite radio wave reception processing unit 50.

In the second mode, however, almanac information or the like used for positioning needs to be newly acquired, and therefore the time required for positioning is longer than in the first mode (for example, about 30 seconds to one minute required).

In the case where the leap second acquired flag 421 is off, the CPU 41 tries to acquire the leap second information 5311 (GPS-side leap second information) from the satellite radio wave reception processing unit 50 repeatedly at predetermined intervals until the predetermined timeout period (set longer than 12.5 minutes, which is the transmission cycle of navigation messages of GPS satellites: for example, 15 minutes) has passed after starting the date and time acquisition in the second mode. Hereinafter, in the second mode, the leap second information 5311 acquired at this timing is referred to as "GPS-side leap second information" (corresponding to "leap second information for this time"). The GPS-side leap second information acquired here is the information newly acquired by the satellite radio wave reception processing unit 50 after starting the acquisition operation in the second mode. Therefore, there is no need to acquire leap second information anew for the leap second adjustment at the most recent leap second adjustable timing, by which the CPU 41 sets on the leap second acquired flag 421.

Moreover, when the CPU 41 successfully acquires the GPS-side leap second information, the CPU 41 stores the acquired GPS-side leap second information, as new watch-side leap second information, into the RAM 42 and/or the ROM 61 for updating, in the case where the above (condition 1) is not satisfied or in the case where (condition 2) is not satisfied and (condition 3) is satisfied.

In the case where the above (condition 1) is not satisfied, it is able to be determined that the acquired GPS-side leap second information is information different from the watch-side leap second information at that time (the current leap second) and that the acquired GPS-side leap second information contains the latest information acquired from the GPS satellite.

In the case where the (condition 2) is not satisfied and the (condition 3) is satisfied, it is able to be determined that the acquired GPS-side leap second information is information different from the watch-side leap second information at that time (the next leap second update date and the leap second after the next update) and contains the latest information acquired from the GPS satellite.

Therefore, in these cases, the CPU 41 stores the GPS-side leap second information as new watch-side leap second information in the RAM 42 and/or ROM 61 for updating.

The reason why the GPS-side leap second information is not stored in the RAM 42 and/or the ROM 61 as watch-side leap second information in the case where the (condition 3) is not satisfied is the same as in the first mode. In addition, in the case where there is no situation in which the GPS-side leap second information newly acquired in the second mode is older than the watch-side leap second information, such as when the leap second information is not acquired from a positioning satellite other than a GPS satellite, a determination of whether the (condition 3) is satisfied may be omitted. Specifically, in the case where at least one of the (condition 1) and the (condition 2) is not satisfied (in the case where the current leap second in the GPS-side leap second information differs from the current leap second in the watch-side leap second information, or the leap second after the next update in the GPS-side leap second information differs from the leap second after the next update in the watch-side leap second information), the watch-side leap second information may be updated with the content of the GPS-side leap second information.

The reason why the GPS-side leap second information is not stored in the RAM 42 and/or the ROM 61 as the watch-side leap second information in the case where both the (condition 1) and the (condition 2) are satisfied is the same as in the first mode.

<Pattern of Update Operation of Leap Second Information>

The patterns of the above leap second information update operation in the first mode and the second mode are specifically described with reference to FIG. 4.

FIG. 4 is a diagram for describing the patterns of the leap second information update operation.

In FIG. 4, it is assumed that, on Jan. 1, 2023 (after 23:59:59 on Dec. 31, 2022), the leap second (the total number of leap seconds inserted by the leap second adjustment performed after Jan. 6, 1980) is adjusted from 18 to 19 (seconds).

Column (a) of FIG. 4 represents the content of the watch-side leap second information stored in the leap second information 422 in the RAM 42 and/or the leap second information 612 in the ROM 61 (the current leap second, the next leap second update date, the leap second after the next update). For example, "18, 2023/1/1, 19" indicates that the current leap second is "18 seconds," the next leap second update date is "2023/1/1," and the leap second after the next update is "19 seconds." Moreover, "2000/0/0" indicates that the next leap second update date is indefinite.

Column (b) represents the content of the GPS-side leap second information (leap second information 5311), which is acquired after the end of the first mode or during the execution of the second mode. Although not illustrated in FIG. 4, in the case where the satellite radio wave reception processing unit 50 does not receive a UTC correction parameter from a positioning satellite, the GPS-side leap second information contains only the initial value of the current leap second (18 seconds) with the next leap second update date and the leap second after the next update set to null.

In FIG. 4, patterns P1 to P12 are illustrated, having combinations of the watch-side leap second information and the GPS-side leap second information different from each other.

Column (c) represents whether the GPS-side leap second information is updated as watch-side leap second information at the end of the first mode ("YES" for updating, "NO" for not updating) in the case of the pattern in the row.

Column (d) represents whether the GPS-side leap second information is updated as watch-side leap second information in the second mode ("YES" for updating, "NO" for not updating) in the case of the pattern in the row.

At the end of the first mode, a situation where at least one of the conditions (condition 1) and (condition 2) is not satisfied and (condition 3) is satisfied occurs only in the case of the pattern P2 (the watch-side leap second information is "18, 2000/0/0, 18" and the GPS-side leap second information is "18, 2023/1/1, 19"). Therefore, at the end of the first mode, the watch-side leap second information is updated for the pattern P2, and the watch-side leap second information is not updated for other patterns P1 and P3 to P12.

The reasons why the watch-side leap second information is not updated for other patterns P1 and P3 to P12 are as follows:

Patterns P1, P6, and P9 to P12: Because both of the (condition 1) and the (condition 2) are satisfied.

Patterns P3 and P7: Because the (condition 3) is not satisfied. In the patterns P3 and P7, the GPS-side leap second information is "19, 2023/1/1, 19" and the current leap second is "19 seconds" and therefore the current date and time when the GPS-side leap second information is acquired is later than 2023/1/1. Accordingly, the (condition 3) is not satisfied.

Patterns P4, P5, and P8: the next leap second update date of the GPS-side leap second information is indefinite (2000/0/0), and the (condition 3) is not satisfied.

In the second mode, the (condition 1) is not satisfied in the case of the patterns P3, P4, P7, and P8, and the (condition 2) is not satisfied and the (condition 3) is satisfied in the case of the pattern P2. Therefore, in the second mode, the watch-side leap second information is updated in the case of the patterns P2 to P4, P7, and P8, while the watch-side leap second information is not updated in the case of other patterns P1, P5, P6, and P9 to P12.

The reasons why the watch-side leap second information is not updated in the case of other patterns P1, P5, P6, and P9 to P12 are as follows:

Patterns P1, P6, and P9 to P12: Because both of the (condition 1) and the (condition 2) are satisfied.

Pattern P5: Because the next leap second update date of the GPS-side leap second information is indefinite (2000/0/0) and the (condition 3) is not satisfied. In the second mode, once the leap second information 5311 is erased, and therefore the combination of the watch-side leap second information and the GPS-side leap second information is not as in the pattern P5 in the case where information is acquired only from a GPS satellite. In the case where information is acquired from multiple types of satellites, however, such GPS-side leap second information may be acquired from a positioning satellite whose leap second information is updated late.

<Activity Control Process>

Figure 5:
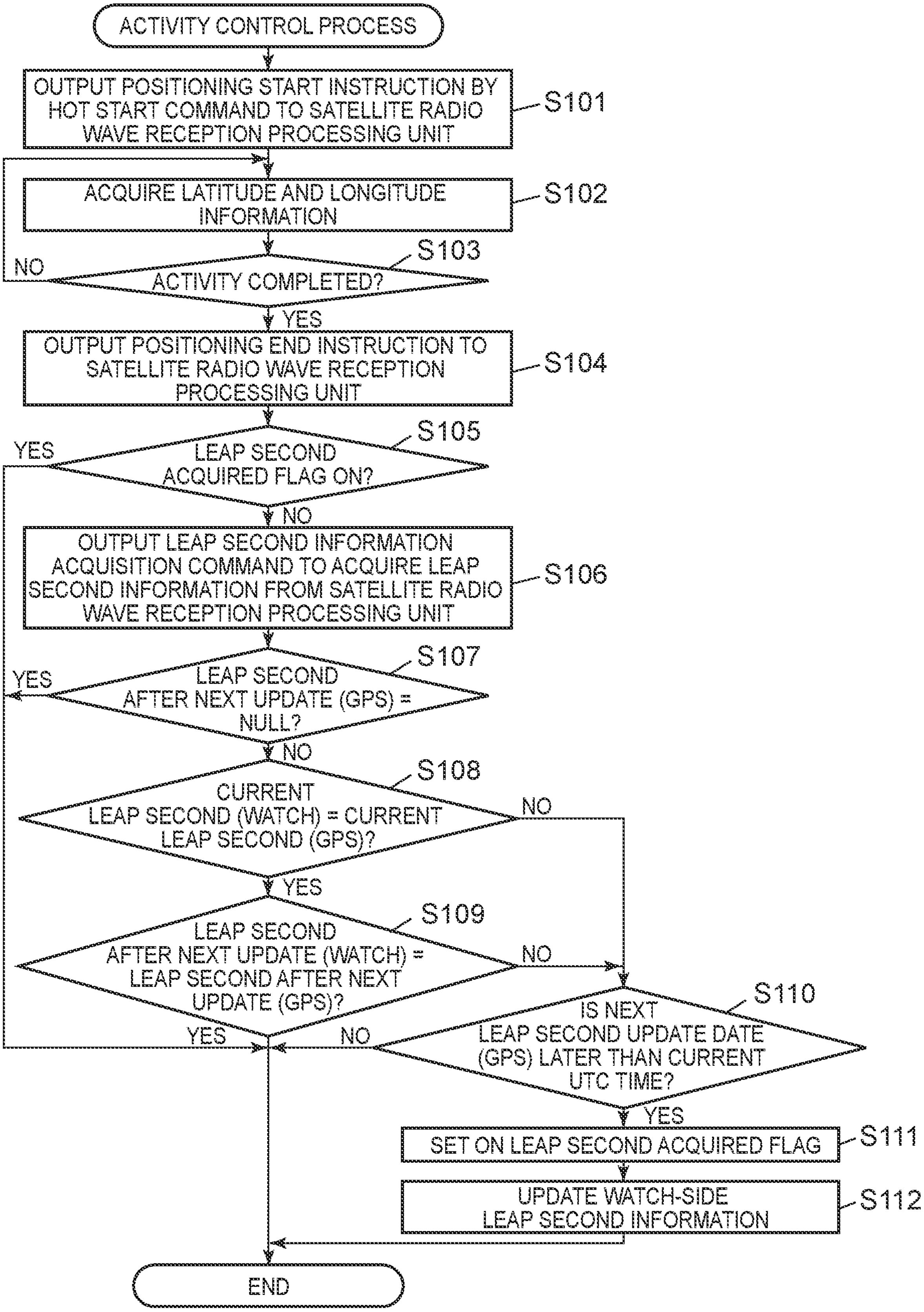
FIG. 5 is a flowchart illustrating a control procedure by a CPU for an activity control process.

FIG. 5 is a flowchart illustrating a control procedure by the CPU 41 for an activity control process performed in the electronic watch 1 of this embodiment.

This activity control process is started when an activity that requires continuous positioning is started by a predetermined input operation to the operation reception unit 64 or in response to a request from another application program that is running or the like.

When the activity control process is started, the CPU 11 activates the satellite radio wave reception processing unit 50 in the first mode. Specifically, the CPU 41 outputs a positioning start instruction by a hot start command to the satellite radio wave reception processing unit 50 (step S101). Once positioning by the satellite radio wave reception processing unit 50 is started, the CPU 41 repeatedly acquires latitude and longitude information (location information) from the satellite radio wave reception processing unit 50 at predetermined timing (step S102).

The CPU 41 determines whether the activity is completed (step S103), and in the case where it is determined that the activity is not completed ("NO" in step S103), the process returns to step S102. In the case where it is determined that the activity is completed ("YES" in step S103), the CPU 41 outputs a positioning end instruction to the satellite radio wave reception processing unit 50 (step S104).

The CPU 41 determines whether the leap second acquired flag 421 is on (step S105). In the case where it is determined that the leap second acquired flag 421 is on (in a set state) ("YES" in step S105), the CPU 41 terminates the activity control process.

In the case where it is determined that the leap second acquired flag 421 is off (not in a set state or in a reset state) ("NO" in step S105), the CPU 41 outputs the leap second information acquisition command and acquires GPS-side leap second information (leap second information 5311) from the satellite radio wave reception processing unit 50 (step S106).

The CPU 41 determines whether the leap second after the next update in the acquired GPS-side leap second information is null (step S107). In the case where it is determined that the leap second after the next update is null ("YES" in step S107), the activity control process is terminated.

In the case where it is determined that the leap second after the next update in the acquired GPS-side leap second information is not null ("NO" in step S107), the CPU 41 determines whether the current leap second in the watch-side leap second information is identical with the current leap second in the GPS-side leap second information (step S108). Step S108 corresponds to the process of determining whether the above (condition 1) is satisfied. In the case where it is determined that the current leap second in the watch-side leap second information is identical with the current leap second in the GPS-side leap second information ("YES" in step S108), the CPU 41 determines whether the leap second after the next update in the watch-side leap second information is identical with the leap second after the next update in the GPS-side leap second information (step S109). Step S109 corresponds to the process of determining whether the above (condition 2) is satisfied. In the case where it is determined that the leap second after the next update in the watch-side leap second information is identical with the leap second after the next update in the GPS-side leap second information ("YES" in step S109), the CPU 41 terminates the activity control process.

In the case where it is determined that the current leap second in the watch-side leap second information differs from the current leap second in the GPS-side leap second information ("NO" in step S108), or in the case where it is determined that the leap second after the next update in the watch-side leap second information differs from the leap second after the next update in the GPS-side leap second information ("NO" in step S109), the CPU 41 determines whether the next leap second update date in the GPS-side leap second information is later than the current UTC time counted by the timing circuit 47 (step S110). Step S110 corresponds to the process of determining whether the above (condition 3) is satisfied. In the case where it is determined that the next leap second update date in the GPS-side leap second information is not later than the current UTC time ("NO" in step S110), the CPU 41 terminates the activity control process.

In the case where it is determined that the next leap second update date in the GPS-side leap second information is later than the current UTC time ("YES" in step S110), the CPU 41 sets on the leap second acquired flag 421 (step S111). Moreover, the CPU 41 updates the watch-side leap second information (the leap second information 422 in the RAM 42 and/or the leap second information 612 in the ROM 61) to the content of the acquired GPS-side leap second information (step S112).

After the completion of step S112, the CPU 41 terminates the activity control process.

<Date and Time Acquisition Control Process>

Figure 6:
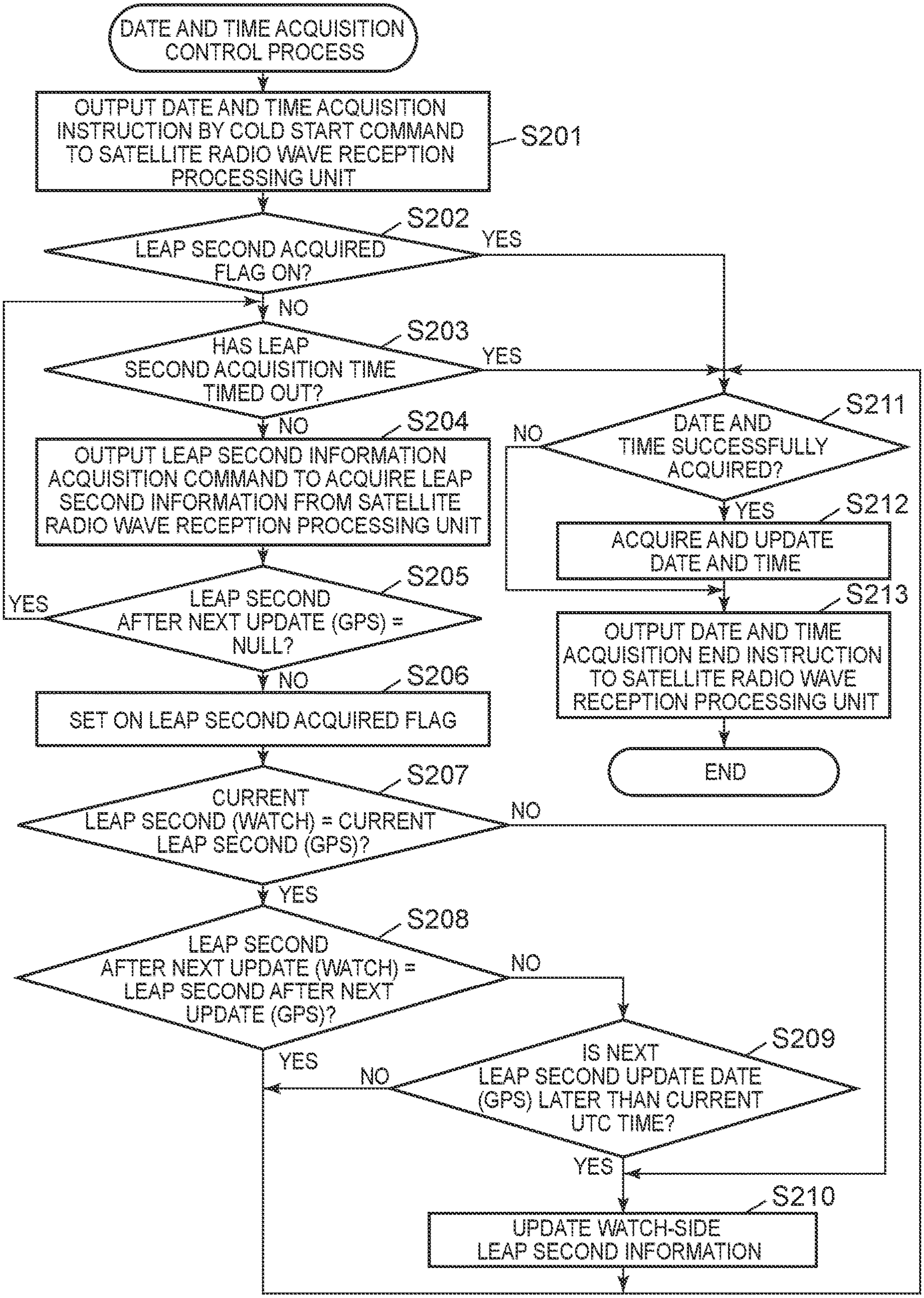
FIG. 6 is a flowchart illustrating a control procedure by the CPU for a date and time acquisition control process.

FIG. 6 is a flowchart illustrating a control procedure by the CPU 41 for a date and time acquisition control process performed in the electronic watch 1.

This date and time acquisition control process is started when a predetermined input operation that gives an instruction for acquiring the date and time is performed on the operation reception unit 64, or when a condition is first met at a predetermined frequency, such as once a day, for example, when the intensity of light is detected by the light intensity sensor 63 to be above a level corresponding to daytime ambient light (in other words, when it is able to be determined that the user is outdoors).

When the date and time acquisition control process is started, the CPU 11 activates the satellite radio wave reception processing unit 50 in the second mode. In other words, the CPU 41 outputs a date and time acquisition instruction by a cold start command to the satellite radio wave reception processing unit 50 (step S201). Moreover, the CPU 41 determines whether the leap second acquired flag 421 is on (step S202). In the case where it is determined that the leap second acquired flag 421 is on ("YES" in step S202), the CPU 41 moves the process to step S211 described later.

In the case where it is determined in step S202 that the leap second acquired flag 421 is off ("NO" in step S202), the CPU 41 determines whether the predetermined leap second acquisition time (for example, 15 minutes) has timed out (passed) (step S203). In the case where it is determined that the leap second acquisition time has timed out ("YES" in step S203), the CPU 41 moves the process to step S211. In the case where it is determined that the leap second acquisition time has not timed out ("NO" in step S203), the CPU 41 outputs a leap second information acquisition command to acquire the GPS-side leap second information (leap second information 5311) from the satellite radio wave reception processing unit 50 (step S204).

The CPU 41 determines whether the leap second after the next update in the acquired GPS-side leap second information is null (step S205), and in the case where it is determined that the leap second after the next update is null ("YES" in step S205), the CPU 41 returns the process to step S203.

In the case where it is determined that the leap second after the next update of the acquired GPS-side leap second information is not null ("NO" in step S205), the CPU 41 sets on the leap second acquired flag 421 (step S206).

The CPU 41 determines whether the current leap second in the watch-side leap second information is identical with the current leap second in the GPS-side leap second information (step S207). Step S207 corresponds to the process of determining whether the above (condition 1) is satisfied. In the case where it is determined that the current leap second in the watch-side leap second information is identical with the current leap second in the GPS-side leap second information ("YES" in step S207), the CPU 41 determines whether the leap second after the next update in the watch-side leap second information is identical with the leap second after the next update in the GPS-side leap second information (step S208). Step S208 corresponds to the process of determining whether the above (condition 2) is satisfied. In the case where it is determined that the leap second after the next update in the watch-side leap second information is identical with the leap second after the next update in the GPS-side leap second information ("YES" in step S208), the CPU 41 moves the process to step S211.

In the case where it is determined that the leap second after the next update in the watch-side leap second information differs from the leap second after the next update in the GPS-side leap second information ("NO" in step S208), the CPU 41 determines whether the next leap second update date in the GPS-side leap second information is later than the current UTC time counted by the timing circuit 47 (step S209). Step S209 corresponds to the process of determining whether the above (condition 3) is satisfied. In the case where the next leap second update date in the GPS-side leap second information is not later than the current UTC time ("NO" in step S209), the CPU 41 moves the process to step S211.

In the case where the next leap second update date in the GPS-side leap second information is determined to be later than the current UTC time ("YES" in step S209), or in the case where the current leap second in the watch-side leap second information differs from the current leap second in the GPS-side leap second information ("NO" in step S207), the CPU 41 updates the watch-side leap second information (the leap second information 422 in the RAM 42 and/or the leap second information 612 in the ROM 61) to the content of the acquired GPS-side leap second information (step S210), and then moves the process to step S211.

In step S211, the CPU 41 waits for an input from the satellite radio wave reception processing unit 50 and determines whether the date and time are successfully acquired. In the case where it is determined that the date and time are successfully acquired ("YES" in step S211), the CPU 41 acquires the date and time and updates the date and time counted by the timing circuit 47 (step S212). The time acquired from the satellite radio wave reception processing unit 50 is the time reflecting the current leap second in the leap second information 5311 at that time. When step S212 is completed, or in the case where it is determined that the date and time are not acquired successfully (failed) in step S211 ("NO" in step S211), the CPU 41 outputs a date and time acquisition end instruction to the satellite radio wave reception processing unit 50 (step S213) and terminates the date and time acquisition control process.

Note that, as described above, in the case where there is no situation in which the GPS-side leap second information newly acquired in the second mode is older than the watch-side leap second information, such as when leap second information is not acquired from a positioning satellite other than a GPS satellite, the determination in step S209 (determination of the (condition 3)) may be omitted. Specifically, in the case where it is determined that the leap second after the next update in the watch-side leap second information differs from the leap second after the next update in the GPS-side leap second information in step S208 ("NO" in step S208), the process may be moved to step S210 to update the watch-side leap second information.

<Satellite Information Acquisition Process>

Figure 7:
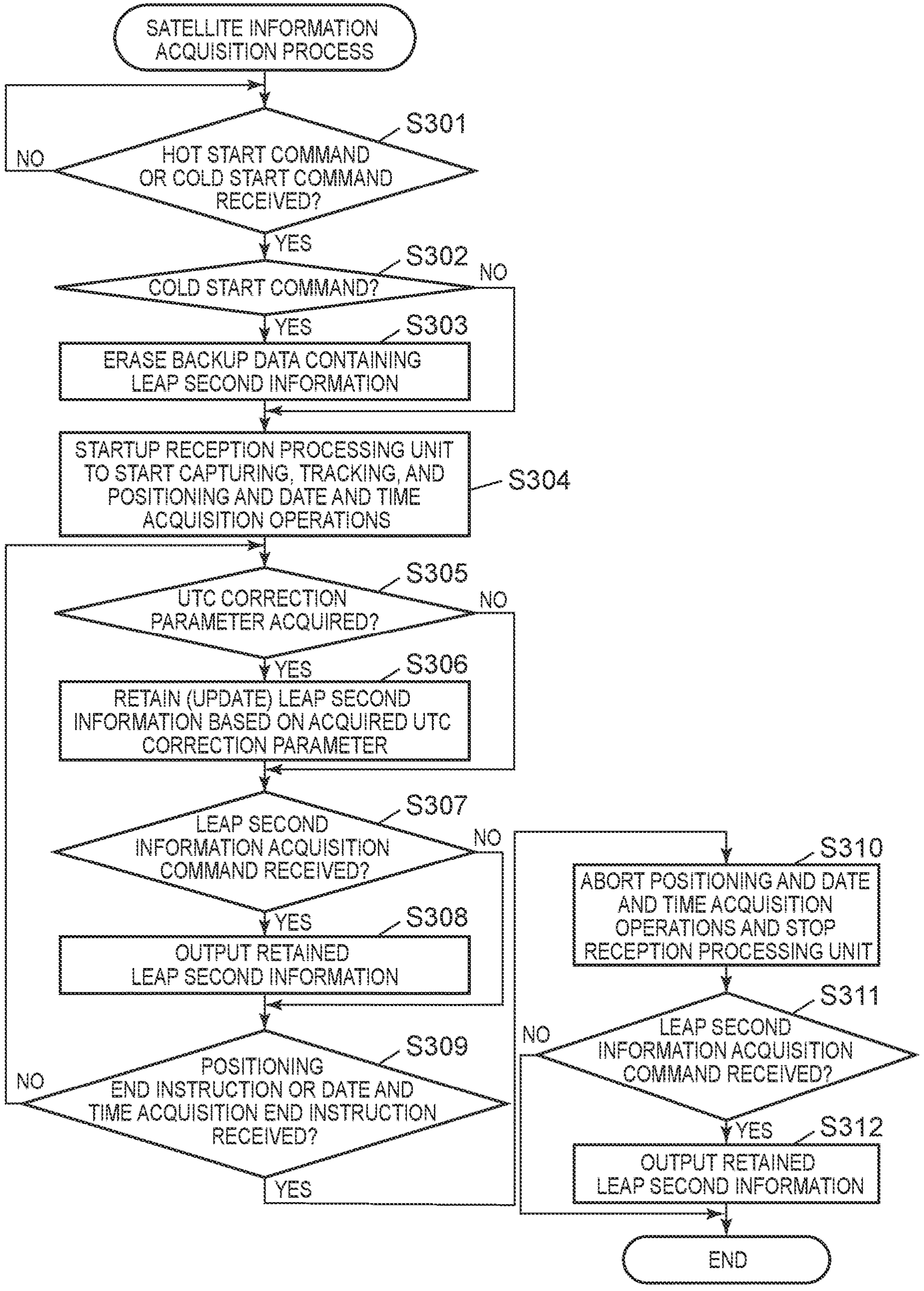
FIG. 7 is a flowchart illustrating a control procedure by a module control unit for a satellite information acquisition process.

FIG. 7 is a flowchart illustrating a control procedure by the module control unit 52 for a satellite information acquisition process performed by the satellite radio wave reception processing unit 50.

This satellite information acquisition process is started when the satellite radio wave reception processing unit 50 is powered on for startup.

When the satellite information acquisition process starts, the module control unit 52 determines whether a hot start command or a cold start command is received from the CPU 41 (step S301). In the case where it is determined that neither command is received ("NO" in step S301), the module control unit 52 performs step S301 again. In the case where it is determined that a hot start command or a cold start command is received ("YES" in step S301), the module control unit 52 determines whether the received command is a cold start command (step S302). In the case where it is determined that the received command is a cold start command ("YES" in step S302), the module control unit 52 erases the backup data 531 containing the leap second information 5311 (step S303).

When step S303 is completed, or in the case where it is determined in step S302 that the received command is a hot start command ("NO" in step S302), the module control unit 52 starts up the reception processing unit 51 to start capturing a positioning satellite and to start tracking the captured positioning satellite and performing a positioning operation and a date and time acquisition operation using radio waves transmitted by the tracked positioning satellite (step S304). The module control unit 52 acquires the obtained positioning results and date and time acquisition results sequentially. In the case of the first mode, the acquisition of the date and time may be omitted. In the case of the second mode, the positioning operation may be omitted.

The module control unit 52 determines whether the UTC correction parameter is acquired from the radio wave transmitted from the positioning satellite (step S305). In the case where it is determined that the UTC correction parameter is acquired ("YES" in step S305), the module control unit 52 generates the leap second information 5311 based on the acquired UTC correction parameter and retains (updates) the leap second information 5311 into the backup data 531 stored in the module memory 53 (step S306).

When step S306 is completed, or in the case where it is determined in step S305 that the UTC correction parameter is not acquired ("NO" in step S305), the module control unit 52 determines whether a leap second information acquisition command is received from the CPU 41 (step S307). In the case where it is determined that the leap second information acquisition command is received ("YES" in step S307), the module control unit 52 outputs the retained leap second information 5311 (GPS-side leap second information) that is retained to the CPU 41 (step S308). Steps S307 and S308 may be performed in the second mode.

When step S308 is completed, or in the case where it is determined in step S307 that the leap second information acquisition command is not received ("NO" in step S307), the module control unit 52 determines whether a positioning end instruction or a date and time acquisition end instruction is received from the CPU 41 (step S309). In the case where it is determined that neither is acquired ("NO" in step S309), the module control unit 52 returns the process to step S305.

In the case where it is determined that a positioning end instruction or a date and time acquisition end instruction is received from the CPU 41 ("YES" in step S309), the module control unit 52 aborts the positioning operation and the date and time acquisition operation, and stops the acquisition operation by the reception processing unit 51 (step S310).

The module control unit 52 determines whether a leap second information acquisition command is received from the CPU 41 (step S311). In the case where it is determined that the leap second information acquisition command is received ("YES" in step S311), the module control unit 52 outputs the leap second information 5311 (GPS-side leap second information) that is retained to the CPU 41 (step S312). Steps S311 and S312 may be performed in the first mode. When step S312 is completed, or in the case where it is determined in step S311 that the leap second information acquisition command is not received ("NO" in step S311), the module control unit 52 terminates the positioning control process.

<Leap Second Adjustment Process>

Figure 8:
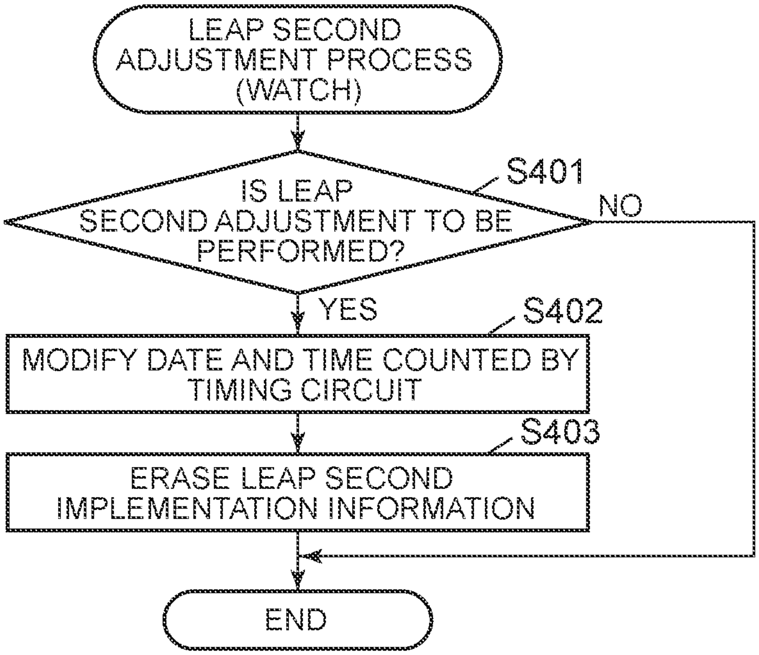
FIG. 8 is a flowchart illustrating a control procedure by the CPU for a leap second adjustment process.

FIG. 8 is a flowchart illustrating a control procedure by the CPU 41 for a leap second adjustment process (on the side of the electronic watch 1) performed at adjustable timing.

Figure 9:
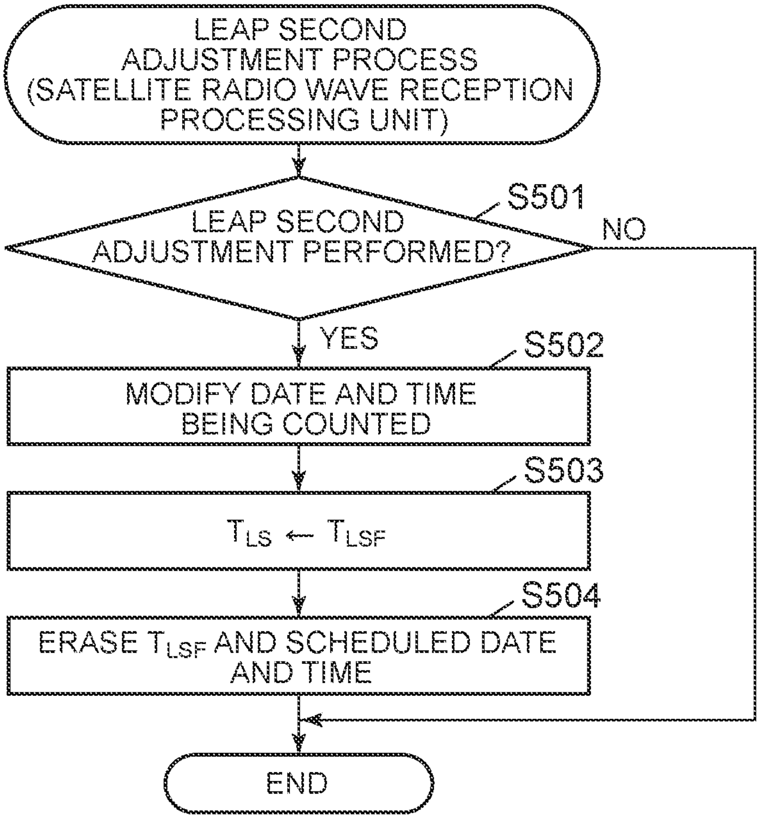
FIG. 9 is a flowchart illustrating a control procedure by the module control unit for the leap second adjustment process.

FIG. 9 is a flowchart illustrating a control procedure by the module control unit 52 for a leap second adjustment process (on the side of the satellite radio wave reception processing unit 50) performed at adjustable timing.

These leap second adjustment processes are started up just before the possible timing of performing the leap second adjustment, for example, one second before. In the case where the operation of the module control unit 52 (the satellite radio wave reception processing unit 50) is in a stopped state at this point in time, the leap second adjustment processes may be started up and performed at the next startup.

As illustrated in FIG. 8, when the leap second adjustment process on the side of the electronic watch 1 is started up, the CPU 41 refers to the leap second information 422 (corresponding to "the leap second information last stored in the memory") to determine whether the leap second adjustment is to be performed (in other words, scheduled to be performed) at the adjustable timing for this leap second adjustment (step S401). In this specification, the CPU 41 acquires the implementation type of the leap second adjustment for this time (whether the leap second adjustment is performed or not, and the type of insertion or deletion at the implementation) from the leap second information 422. In the case where it is determined that the leap second adjustment is not performed (not scheduled to be performed) ("NO" in step S401), the CPU 41 terminates the leap second adjustment process.

In the case where it is determined that the leap second adjustment is to be performed (scheduled to be performed) ("YES" in step S401), the CPU 41 modifies the date and time counted by the timing circuit 47 (step S402). Moreover, in the case where the display unit 65 is able to display "60 seconds" digitally, the CPU 41 outputs a control signal to the display driver 66 and inserts the display of "60 seconds" after the display of "59 seconds." Alternatively, in the case where the display unit 65 drives the hour and minute hands and the second hand separately for analog display, the CPU 41 outputs a control signal to the display driver 66 (the drive circuit of a stepping motor) to first move the second hand to 0 second without moving the hour and minute hands to the correct time positions, and then to move the hour and minute hands to the correct time positions without moving the second hand at the next second.

The CPU 41 deletes the information on the implementation type of leap second adjustment (whether leap second adjustment is performed and the type of insertion or deletion) contained in the leap second information 422 (step S403). Note that the information may be simply overwritten when new implementation information of leap second adjustment is acquired after six months or so, without performing this process in step S403. Then, the CPU 41 terminates the leap second adjustment process (host).

As illustrated in FIG. 9, when the leap second adjustment process on the side of the satellite radio wave reception processing unit 50 is started up, the module control unit 52 refers to the leap second information 5311 to determine whether the leap second adjustment is (has been) performed at adjustable timing (or during operation stop) for this leap second adjustment (step S501). In the case where it is determined that the leap second adjustment is not (has not been) performed ("NO" in step S501), the module control unit 52 terminates the leap second adjustment process.

In the case where it is determined that the leap second adjustment is (has been) performed ("YES" in step S501), the module control unit 52 modifies the current date and time being counted (step S502).

The module control unit 52 updates the shift amount TLS (the current leap second) with the scheduled value TLSF (the leap second after the next update) (step S503) and erases the scheduled value TLSF (the leap second after the next update) and the scheduled date and time (the next leap second update date) (step S504). Then, the module control unit 52 terminates the leap second adjustment process (the satellite radio wave reception processing unit).

Advantageous Effects

As described above, the satellite radio wave receiving device 100 of the present embodiment includes: the satellite radio wave reception processing unit 50 that performs an acquisition operation of receiving a transmitted radio wave from a positioning satellite and acquiring information contained in the transmitted radio wave; the CPU 41; and the RAM 42 and the ROM 61 in which leap second information 5311 may be stored, wherein the satellite radio wave reception processing unit 50 retains the leap second information 5311 related to the leap second adjustment last acquired by the acquisition operation, and wherein the CPU 41 activates the satellite radio wave reception processing unit 50 in at least two modes including the first mode in which the acquisition operation is performed for continuous positioning, and in the case of activating the satellite radio wave reception processing unit 50 in the first mode, the CPU 41 starts the acquisition operation without erasing the backup data 531 that includes the leap second information 5311 retained by the satellite radio wave reception processing unit 50 and acquires the leap second information 5311 (GPS-side leap second information) retained by the satellite radio wave reception processing unit 50 after the end of the first mode operation (step S106 in FIG. 5), and in the case where the acquired GPS-side leap second information (the leap second information for this time) is determined to be newer than the watch-side leap second information (the leap second information 422 and/or the leap second information 612) stored in the RAM 42 and/or the ROM 61 ("YES" in step S110), the CPU 41 stores the GPS-side leap second information into the RAM 42 and/or the ROM 61 (step S112) and performs a leap second adjustment for the counted current date and time on the basis of the watch-side leap second information lastly stored in the RAM 42 and/or the ROM 61 (step S402 in FIG. 8).

For example, as disclosed in Japanese Unexamined Paten Application Publication No. 2008-145287, when the information acquired in the past from the transmitted radio wave of the positioning satellite is erased, it is necessary to newly acquire almanac information to be used for capturing the positioning satellite, and it takes time for positioning. On the other hand, in the case of performing positioning without erasing the information acquired in the past in order to shorten the positioning time, the last acquired leap second information is retained as it is. Therefore, it is not possible to determine whether new leap second information has been successfully acquired by simply referring to the retained leap second information. Thus, the technique disclosed in the above publication is not capable of correctly determining whether the leap second information has been successfully acquired, while avoiding the extension of positioning time. This means that there is a possibility that the leap second adjustment may not be performed correctly.

On the other hand, according to the satellite radio wave receiving device of the present disclosure, the acquisition operation is performed without erasing the leap second information 5311 in the second mode as described above, thereby enabling determination of whether new leap second information 5311, which is able to be used for the next leap second adjustment, is successfully acquired, while enabling a short positioning time using the backup data 531. In addition, since the leap second information 5311 is able to be acquired in parallel with continuous positioning, such as during performing an activity, the frequency at which a user has to wait for a long time (up to 12.5 minutes for a GPS satellite) to acquire the leap second information 5311 is able to be reduced.

Moreover, the CPU 41 determines that the GPS-side leap second information is newer than the watch-side leap second information, in the case where the current leap second in the GPS-side leap second information differs from the current leap second in the watch-side leap second information ("NO" in step S108 of FIG. 5) or in the case where the leap second after the next update in the GPS-side leap second information differs from the leap second after the next update in the watch-side leap second information ("NO" in step S109 of FIG. 5), and in the case where the GPS-side leap second information contains information related to the next leap second update date and the next leap second update date is later than the current date and time ("YES" in step S110 of FIG. 5). Thereby, in the case where the GPS-side leap second information is able to be confirmed to be information that represents the content of adjustment at the next most recent leap second adjustable timing, the watch-side leap second information is able to be updated with the content of the GPS-side leap second information. This prevents the occurrence of a problem in which leap second adjustment is performed based on inappropriate watch-side leap second information.

Furthermore, the CPU 41 activates the satellite radio wave reception processing unit 50 in the second mode in which the acquisition operation is performed to acquire the current date and time in addition to the first mode. In the case of activating the satellite radio wave reception processing unit 50 in the second mode, the CPU 41 erases the backup data 531 including the leap second information 5311 that is retained by the satellite radio wave reception processing unit 50 before starting the acquisition operation, and acquires the leap second information 5311 (GPS-side leap second information) acquired anew by the satellite radio wave reception processing unit 50 after starting the acquisition operation from the satellite radio wave reception processing unit 50 (step S204 of FIG. 6). Further, in the case where the current leap second in the acquired GPS-side leap second information differs from the current leap second in the watch-side leap second information stored in the RAM 42 and/or the ROM 61 ("NO" in step S207), the CPU 41 stores the GPS-side leap second information into the RAM 42 and/or the ROM 61 (step S210). In this manner, the acquisition operation is performed after erasing the leap second information 5311 in the first mode, thereby enabling the latest leap second information 5311 (GPS-side leap second information) to be retained in the module memory 53 of the satellite radio wave reception processing unit 50 in the case where the UTC correction parameter is acquired from the radio wave transmitted by a positioning satellite. Therefore, the CPU 41 is able to acquire the latest GPS-side leap second information. Moreover, the CPU 41 is able to acquire the accurate current date and time reliably on the basis of the newly acquired information from the transmitted radio wave. Moreover, in the case where the acquired current leap second in the GPS-side leap second information differs from the current leap second in the watch-side leap second information, the GPS-side leap second information is able to be determined to be newer than the watch-side leap second information, and therefore, updating the watch-side leap second information with the content of the GPS-side leap second information enables the watch-side leap second information to be changed to an appropriate content.

Furthermore, when activating the satellite radio wave reception processing unit 50 in the second mode, the CPU 41 stores the GPS-side leap second information into the RAM 42 and/or the ROM 61 (step S210), in the case where the current leap second in the GPS-side leap second information is identical with the current leap second in the watch-side leap second information ("YES" in step S207 of FIG. 6) and in the case where the leap second after the next update in the GPS-side leap second information differs from the leap second after the next update in the watch-side leap second information ("NO" in step S208), and further in the case where the GPS-side leap second information contains information related to the next leap second update date and the next leap second update date is later than the current date and time ("YES" in step S209). This enables the watch-side leap second information to be updated with the content of the GPS-side leap second information in the case where it is able to be confirmed that the GPS-side leap second information acquired in the second mode is information that represents the content of the adjustment at the next most recent leap second adjustable timing. Therefore, the present disclosure is able to prevent an occurrence of a defect that a leap second adjustment is performed based on inappropriate watch-side leap second information.

In addition, the RAM 42 stores a leap second acquired flag 421 that is set off when leap second information necessary for a leap second adjustment at the leap second adjustable timing within a predetermined period is not stored in the RAM 42 and/or the ROM 61. The CPU 41 acquires leap second information from the satellite radio wave reception processing unit 50 in the case where the leap second acquired flag 421 is off ("NO" in step S105 of FIG. 5). The CPU 41 then sets on the leap second acquired flag 421 in the case where the GPS-side leap second information acquired from the satellite radio wave reception processing unit 50 is determined to be newer than the watch-side leap second information after the end of the operation in the first mode ("YES" in step S110). This enables the leap second acquired flag 421 to be set on, only when the GPS-side leap second information representing the content of the adjustment at the next most recent leap second adjustable timing is acquired in the first mode. In other cases, the leap second acquired flag 421 is kept off, and therefore acquisition is able to be attempted again for appropriate GPS-side leap second information.

Moreover, the RAM 42 stores a leap second acquired flag 421 that is set off when the leap second information necessary for a leap second adjustment at the leap second adjustable timing within a predetermined period is not acquired. In the case of activating the satellite radio wave reception processing unit 50 in the second mode, the CPU 41 starts the acquisition operation after erasing the backup data 531 including the leap second information 5311 that the satellite radio wave reception processing unit 50 retains. The CPU 41 further attempts acquisition of the leap second information from the satellite radio wave reception processing unit 50 when the leap second acquired flag 421 is off ("NO" in step S202 of FIG. 6). The CPU 41 then sets on the leap second acquired flag 421 (step S206) when acquiring new leap second information 5311 from the satellite radio wave reception processing unit 50 after the start of the acquisition operation in the second mode (step S204 and "NO" in step S205). The leap second information 5311 (GPS-side leap second information) acquired from the satellite radio wave reception processing unit 50 in the second mode is information acquired from the positioning satellite anew after starting the acquisition operation in the second mode. Accordingly, there is no need to acquire new leap second information thereafter for the leap second adjustment at the most recent leap second adjustable timing, and therefore setting on the leap second acquired flag 421 at the above timing enables prevention of an unnecessary acquisition operation of leap second information.

Furthermore, the electronic watch 1 includes the satellite radio wave receiving device 100 described above, thereby enabling correct determination of whether the leap second information 5311 is successfully acquired while avoiding the extension of the positioning time, and thus enabling the leap second adjustment to be correctly performed. In addition, the leap second information 5311 is able to be acquired in parallel with continuous positioning, such as during the execution of an activity, thereby enabling a reduction in the frequency that the user has to wait for a long time to acquire the leap second information 5311.

Moreover, the first mode is a mode in which positioning is automatically performed at a first predetermined interval while measuring the activity of a user wearing the electronic watch 1. This allows the user to acquire the leap second information during continuous positioning. This reduces the frequency that the user has to wait for a long time to acquire the leap second information 5311.

The second mode is a mode in which positioning is performed automatically at a second predetermined interval or in response to a predetermined input operation by a user wearing the electronic watch 1. Thereby, the user is able to acquire the leap second information in the second mode when the user is not able to acquire the leap second information in the first mode.

The date and time information acquisition control method performed by the satellite radio wave receiving device 100 according to this embodiment includes: activating the satellite radio wave reception processing unit 50 in at least two modes including the first mode in which the acquisition operation is performed for continuous positioning; in the case of activating the satellite radio wave reception processing unit 50 in the first mode, starting the acquisition operation without erasing the backup data 531 that includes the leap second information 5311 retained by the satellite radio wave reception processing unit 50 and acquiring the leap second information 5311 (GPS-side leap second information) retained by the satellite radio wave reception processing unit 50 after the end of the first mode operation (step S106 in FIG. 5), and in the case where the acquired GPS-side leap second information is determined to be newer than the watch-side leap second information stored in the RAM 42 and/or the ROM 61 ("YES" in step S110), storing the GPS-side leap second information into the RAM 42 and/or the ROM 61 (step S112); and performing a leap second adjustment for the counted current date and time, based on the watch-side leap second information lastly stored in the RAM 42 and/or the ROM 61 (step S402 in FIG. 8). This allows correct determination of whether the leap second information 5311 is successfully acquired, while avoiding the extension of the positioning time. In addition, the leap second information 5311 is able to be acquired in parallel with continuous positioning, such as during the execution of an activity, thereby enabling a reduction in the frequency that the user has to wait for a long time to acquire the leap second information 5311.

The program 611 according to this embodiment causes the CPU 41, as a computer of the satellite radio wave receiving device 100, to perform the processes of: activating the satellite radio wave reception processing unit 50 in at least two modes including the first mode in which the acquisition operation is performed for continuous positioning; in the case of activating the satellite radio wave reception processing unit 50 in the first mode, starting the acquisition operation without erasing the backup data 531 that includes the leap second information 5311 retained by the satellite radio wave reception processing unit 50 and acquiring the leap second information 5311 (GPS-side leap second information) retained by the satellite radio wave reception processing unit 50 after the end of the first mode operation (step S106 in FIG. 5), and in the case where the acquired GPS-side leap second information is determined to be newer than the watch-side leap second information stored in the RAM 42 and/or the ROM 61 ("YES" in step S110), storing the GPS-side leap second information into the RAM 42 and/or the ROM 61 (step S112); and performing a leap second adjustment for the counted current date and time, based on the watch-side leap second information lastly stored in the RAM 42 and/or the ROM 61 (step S402 in FIG. 8). This allows correct determination of whether the leap second information 5311 is successfully acquired, while avoiding the extension of the positioning time. In addition, the leap second information 5311 is able to be acquired in parallel with continuous positioning, such as during the execution of an activity, thereby enabling a reduction in the frequency that the user has to wait for a long time to acquire the leap second information 5311.

Others

The present disclosure is not limited to the above embodiments, but may be modified in various ways.

For example, in the above embodiments, the timing at which the leap second acquired flag 421 is set off (hereinafter, referred to as "first reference timing") is set at the head timing as the beginning (December 1 or June 1) of the month (December or June) in which leap second adjustment may be performed, and thereafter a period of one month is set for attempting to acquire the leap second information 5311, but the present disclosure is not limited thereto. The first reference timing may be before the head timing of the month in which the leap second adjustment may be performed. In this case, however, it is preferable to set the first reference timing within the period when the leap second adjustment implementation information for the target adjustable timing is included in the radio wave from the positioning satellite. In addition, the first reference timing may be set to a point after the head timing of the month in which the leap second adjustment may be performed and before the possible timing of performing the leap second adjustment.

Moreover, the leap second acquired flag 421 may be set off when the user manually changes the current date and time timed by the electronic watch 1 and when the user performs an operation of initializing the operation settings of the electronic watch 1, in addition to the arrival at the first reference timing.

The acquisition of the leap second information 5311 in the second mode may be performed on (for example, June 24 or December 25) or after the second reference timing, which is after the first reference timing and before the possible timing of the leap second adjustment. Specifically, an attempt is made to acquire the leap second information 5311 in the first mode in which continuous positioning is performed from the first reference timing to the second reference timing, and in the case where the leap second information 5311 failed to be acquired in the first mode by the second reference timing, an attempt may be made thereafter to acquire the leap second information 5311 also in the second mode.

Moreover, after acquiring information that the leap second adjustment is scheduled to be performed from an external device via the communication unit 62, the leap second information 5311 may be acquired in the second mode.

These enable a further reduction in the frequency that the user has to wait for a long time to acquire the leap second information 5311 in the second mode.

Furthermore, in the above embodiments, the present disclosure has been described by giving an example that the CPU 41 adjusts the date and time counted by the timing circuit 47 in the electronic watch 1 and an example that the module control unit 52 in the satellite radio wave reception processing unit 50 adjusts the date and time of an internal clock (including an internal clock acquired from the CPU 41 for counting or an internal clock used for temporary counting for an output to the CPU 41), but only an adjustment signal may be output to an external timekeeping unit during leap second adjustment.

For three months or more from the adjustable timing to which the most recent adjustable timing changes (on or after September 1 or March 1), the CPU 41 may choose not to acquire the GPS-side leap second information and update the watch-side leap second information.

Moreover, the timing of receiving the UTC correction parameter may be calculated after acquiring the date and time information, and the acquisition operation may be performed again at the calculated timing of receiving the UTC correction parameter.

Although the electronic watch 1 (the satellite radio wave reception processing unit 50) is capable of receiving the radio waves from both GPS and GLONASS satellites in the above embodiments, the electronic watch 1 may be capable of receiving radio waves from only one of the GPS and GLONASS satellites. Moreover, the electronic watch 1 may also be capable of receiving radio waves transmitted from other positioning satellites (Michibiki, Galileo, and the like).

In the above embodiments, the present disclosure has been described by giving an example of the satellite radio wave receiving device 100 provided in the electronic watch 1, but the device is not limited to those provided in electronic devices whose main function is as a watch. The present disclosure is also able to be applied to an electronic device capable of performing a positioning operation by receiving a radio wave from a positioning satellite and mainly performing other functions, in particular, to portable electronic devices in general.

In the above embodiment, the present disclosure has been described assuming that the CPU 41 performs the processes related to the acquisition operation control of the implementation information for leap second adjustment, but the CPU 41 is not limited to a single CPU 41 as a processor performing processes. A plurality of CPUs may perform distributed processing, and some or all of the control and arithmetic operations may be performed by hardware such as dedicated logic circuits.

In the above description, the ROM 61 is illustrated as a computer-readable medium for the program of the present disclosure, but the ROM 61 is not limited thereto. As other computer-readable media, various types of non-volatile memories such as a flash memory and electrically erasable and programmable read only memory (EEPROM), and information storage media such as a hard disk drive (HDD), a CD-ROM, and a DVD disk may be applied. Moreover, a carrier wave is also applicable to the present disclosure as a medium for providing the program data for the present disclosure via communication lines.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-151494, filed Sep. 22, 2022 which is hereby incorporated by reference wherein in its entirety.

What is claimed is:

1. A satellite radio wave receiving device comprising:

a receiver that performs an acquisition operation of receiving a transmitted radio wave from a positioning satellite and acquiring information contained in the transmitted radio wave;

one or more processors; and one or more memories in which leap second information related to a leap second adjustment may be stored, wherein the receiver retains the leap second information last acquired by the acquisition operation and wherein the one or more processors perform the following processes according to instructions stored in the one or more memories:

activating the receiver in at least two modes including a first mode in which the acquisition operation is performed for continuous positioning;

in the case of activating the receiver in the first mode, starting the acquisition operation without erasing the leap second information that the receiver retains and acquiring the leap second information that the receiver retains after the end of the first mode operation, and in the case where the acquired leap second information for this time is determined to be newer than the leap second information stored in the one or more memories, storing the leap second information for this time in the one or more memories; and performing a leap second adjustment for the counted current date and time, based on the leap second information lastly stored in the one or more memories.

2. The satellite radio wave receiving device according to claim 1, wherein the one or more processors further perform the following process according to the instructions stored in the one or more memories:

determining that the leap second information for this time is newer than the leap second information stored in the one or more memories, (i) in the case where the current leap second in the leap second information for this time differs from the current leap second in the leap second information stored in the one or more memories or (ii) in the case where a leap second after the next update in the leap second information for this time differs from a leap second after the next update in the leap second information stored in the one or more memories, and in the case where the leap second information for this time contains information related to the next leap second update date and the next leap second update date is later than the current date and time.

3. The satellite radio wave receiving device according to claim 1, wherein the one or more processors further perform the following processes according to the instructions stored in the one or more memories:

activating the receiver in the second mode in which the acquisition operation is performed to acquire the current date and time in addition to the first mode;

in the case of activating the receiver in the second mode:
starting the acquisition operation after erasing the leap second information that is retained in the receiver;
acquiring leap second information that is acquired anew by the receiver after starting the acquisition operation from the receiver; and
storing the leap second information for this time into the one or more memories in the case where the current leap second in the acquired leap second information for this time differs from the current leap second in the leap second information stored in the one or more memories.

4. The satellite radio wave receiving device according to claim 3,
wherein the one or more processors further perform the following process according to the instructions stored in the one or more memories:
in the case of activating the receiver in the second mode:
storing the leap second information for this time into the one or more memories, in the case where the current leap second in the leap second information for this time is identical with the current leap second in the leap second information stored in the one or more memories and in the case where the leap second after the next update in the leap second information for this time differs from the leap second after the next update in the leap second information stored in the one or more memories, and further in the case where the leap second information for this time contains information related to the next leap second update date and the next leap second update date is later than the current date and time.

5. The satellite radio wave receiving device according to claim 3,
wherein:
the one or more memories store an acquired flag that is set off when leap second information necessary for a leap second adjustment at a leap second adjustable timing within a predetermined period is not acquired; and
the one or more processors further perform the following processes according to the instructions stored in the one or more memories:
starting the acquisition operation after erasing the leap second information that the receiver retains in the case of activating the receiver in the second mode;
attempting acquisition of the leap second information from the receiver when the acquired flag is off; and
setting on the acquired flag when acquiring the leap second information anew from the receiver after the start of the acquisition operation in the second mode.

6. The satellite radio wave receiving device according to claim 1,
wherein:
the one or more memories store an acquired flag that is set off when leap second information necessary for a leap second adjustment at a leap second adjustable timing within a predetermined period is not stored in the one or more memories; and
the one or more processors further perform the following processes according to the instructions stored in the one or more memories:
acquiring the leap second information from the receiver in the case where the acquired flag is off; and
setting on the acquired flag in the case where the leap second information for this time acquired from the receiver is determined to be newer than the leap second information stored in the one or more memories after the end of the operation in the first mode.

7. An electronic watch with the satellite radio wave receiving device according to claim 1.

8. The electronic watch according to claim 7, wherein the first mode is a mode in which positioning is automatically performed at a first predetermined interval while measuring the activity of a user wearing the electronic watch.

9. The electronic watch according to claim 7, wherein:
the one or more processors activate the receiver in the second mode in which the acquisition operation is performed to acquire the current date and time in addition to the first mode; and
the second mode is a mode in which positioning is performed automatically at a second predetermined interval or in response to a predetermined input operation by a user wearing the electronic watch.

10. A method performed by a satellite radio wave receiving device,
wherein the satellite radio wave receiving device includes: a receiver that performs an acquisition operation of receiving a transmitted radio wave from a positioning satellite and acquiring information contained in the transmitted radio wave; and one or more memories in which leap second information related to a leap second adjustment may be stored, the receiver retaining the leap second information last acquired by the acquisition operation,
the method includes:
activating the receiver in at least two modes including a first mode in which the acquisition operation is performed for continuous positioning;
in the case of activating the receiver in the first mode, starting the acquisition operation without erasing the leap second information that the receiver retains and acquiring the leap second information that the receiver retains after the end of the first mode operation, and in the case where the acquired leap second information for this time is determined to be newer than the leap second information stored in the one or more memories, storing the leap second information for this time in the one or more memories; and
performing a leap second adjustment for the counted current date and time, based on the leap second information lastly stored in the one or more memories.

11. The method according to claim 10, further comprising:
determining that the leap second information for this time is newer than the leap second information stored in the one or more memories, (i) in the case where the current leap second in the leap second information for this time differs from the current leap second in the leap second information stored in the one or more memories or (ii) in the case where a leap second after the next update in the leap second information for this time differs from a leap second after the next update in the leap second information stored in the one or more memories, and in the case where the leap second information for this time contains information related to the next leap second update date and the next leap second update date is later than the current date and time.

12. The method according to claim 10, still further comprising:

activating the receiver in the second mode in which the acquisition operation is performed to acquire the current date and time in addition to the first mode;

in the case of activating the receiver in the second mode:

starting the acquisition operation after erasing the leap second information that is retained in the receiver;

acquiring leap second information that is acquired anew by the receiver after starting the acquisition operation from the receiver; and storing the leap second information for this time into the one or more memories in the case where the current leap second in the acquired leap second information for this time differs from the current leap second in the leap second information stored in the one or more memories.

13. The method according to claim 12, further comprising:

in the case of activating the receiver in the second mode:

storing the leap second information for this time into the one or more memories, in the case where the current leap second in the leap second information for this time is identical with the current leap second in the leap second information stored in the one or more memories and in the case where the leap second after the next update in the leap second information for this time differs from the leap second after the next update in the leap second information stored in the one or more memories, and further in the case where the leap second information for this time contains information related to the next leap second update date and the next leap second update date is later than the current date and time.

14. The method according to claim 10, wherein the one or more memories store an acquired flag that is set off when leap second information necessary for a leap second adjustment at a leap second adjustable timing within a predetermined period is not stored in the one or more memories; and the method further comprising:

acquiring the leap second information from the receiver in the case where the acquired flag is off; and setting on the acquired flag in the case where the leap second information for this time acquired from the receiver is determined to be newer than the leap second information stored in the one or more memories after the end of the operation in the first mode.

15. A non-transitory computer readable storage medium, storing a program executable by one or more processors in a satellite radio wave receiving device, wherein the satellite radio wave receiving device includes: a receiver that performs an acquisition operation of receiving a transmitted radio wave from a positioning satellite and acquiring information contained in the transmitted radio wave; and one or more memories in which leap second information related to a leap second adjustment may be stored, the receiver retaining the leap second information last acquired by the acquisition operation, the program causing the one or more processors to perform:

activating the receiver in at least two modes including a first mode in which the acquisition operation is performed for continuous positioning;

in the case of activating the receiver in the first mode, starting the acquisition operation without erasing the leap second information that the receiver retains and acquiring the leap second information that the receiver retains after the end of the first mode operation, and in the case where the acquired leap second information for this time is determined to be newer than the leap second information stored in the one or more memories, storing the leap second information for this time in the one or more memories; and performing a leap second adjustment for the counted current date and time, based on the leap second information lastly stored in the one or more memories.

16. The storage medium according to claim 15, the program causing the one or more processors to further perform:

determining that the leap second information for this time is newer than the leap second information stored in the one or more memories, (i) in the case where the current leap second in the leap second information for this time differs from the current leap second in the leap second information stored in the one or more memories or (ii) in the case where a leap second after the next update in the leap second information for this time differs from a leap second after the next update in the leap second information stored in the one or more memories, and in the case where the leap second information for this time contains information related to the next leap second update date and the next leap second update date is later than the current date and time.

17. The storage medium according to claim 15, the program causing the one or more processors to further perform:

activating the receiver in the second mode in which the acquisition operation is performed to acquire the current date and time in addition to the first mode;

in the case of activating the receiver in the second mode:

starting the acquisition operation after erasing the leap second information that is retained in the receiver;

acquiring leap second information that is acquired anew by the receiver after starting the acquisition operation from the receiver; and storing the leap second information for this time into the one or more memories in the case where the current leap second in the acquired leap second information for this time differs from the current leap second in the leap second information stored in the one or more memories.

18. The storage medium according to claim 17, the program causing the one or more processors to further perform:

in the case of activating the receiver in the second mode:

storing the leap second information for this time into the one or more memories, in the case where the current leap second in the leap second information for this time is identical with the current leap second in the leap second information stored in the one or more memories and in the case where the leap second after the next update in the leap second information for this time differs from the leap second after the next update in the leap second information stored in the one or more memories, and further in the case where the leap second information for this time contains information related to the next leap second update date and the next leap second update date is later than the current date and time.

19. The storage medium according to claim 15, wherein:

the one or more memories store an acquired flag that is set off when leap second information necessary for a leap second adjustment at a leap second adjustable timing within a predetermined period is not stored in the one or more memories; and the program causing the one or more processors to perform:

acquiring the leap second information from the receiver in the case where the acquired flag is off; and setting on the acquired flag in the case where the leap second information for this time acquired from the receiver is determined to be newer than the leap second information stored in the one or more memories after the end of the operation in the first mode.

* * * * *